(12) United States Patent
Vandercar et al.

(10) Patent No.: US 12,175,319 B1
(45) Date of Patent: Dec. 24, 2024

(54) WRISTBANDS HAVING RFID CIRCUITS WITH ENHANCED READABILITY

(71) Applicant: ZEBRA TECHNOLOGIES CORPORATION, Lincolnshire, IL (US)

(72) Inventors: Steven J. Vandercar, Rolling Meadows, IL (US); Arianna E. Harding, Cary, IL (US); Nisa A. Khan, Buffalo Grove, IL (US); Michael S. Weinhammer, Cary, IL (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/232,273

(22) Filed: Aug. 9, 2023

(51) Int. Cl.
  *G06K 19/077* (2006.01)
  *A44C 5/00* (2006.01)
  *G06K 19/07* (2006.01)

(52) U.S. Cl.
  CPC ...... *G06K 19/07762* (2013.01); *A44C 5/0007* (2013.01); *G06K 19/0723* (2013.01); *G06K 19/07777* (2013.01)

(58) Field of Classification Search
  CPC .......... G06K 19/07762; G06K 19/0723; A44C 5/0007
  USPC .......................................................... 235/492
  See application file for complete search history.

(56) References Cited

U.S. PATENT DOCUMENTS

| | | | | |
|---|---|---|---|---|
| 2003/0173408 A1* | 9/2003 | Mosher, Jr. | ............ | A61B 90/90 235/492 |
| 2004/0104274 A1* | 6/2004 | Kotik | ................ | G06K 19/0716 235/492 |
| 2013/0182382 A1* | 7/2013 | Vardi | ..................... | G08B 21/22 361/679.01 |
| 2021/0049438 A1* | 2/2021 | Browning, Jr. | .. | G06K 19/07762 |

* cited by examiner

*Primary Examiner* — Allyson N Trail

(57) ABSTRACT

A wristband has a flexible elongated body with an open state in which the wristband is capable of being positioned in a planar configuration and a closed state in which the wristband is wrapped in a loop. An RFID circuit is supported by the body and is positioned on the body such that the RFID circuit is configured to be included in the loop when the wristband is in the closed state. An elongated conductive element is supported by the body and is positioned on the body such that the elongated conductive element is configured to be included in the loop when the wristband is in the closed state. The elongated conductive element is spaced away from the RFID circuit and extends circumferentially about the loop in the closed state.

20 Claims, 17 Drawing Sheets

WRISTBANDS HAVING RFID CIRCUITS WITH ENHANCED READABILITY

BACKGROUND

Wristbands that include radiofrequency identification device (RFID) inlays typically suffer from readability issues due to interference from the body of the wearer of the wristband. The impact of the readability issues can vary based on a position of the RFID inlays relative to the body of the wearer and the RFID reader and can be particularly exasperated when the wrist of the wearer is positioned between the RFID inlay and the RFID reader.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
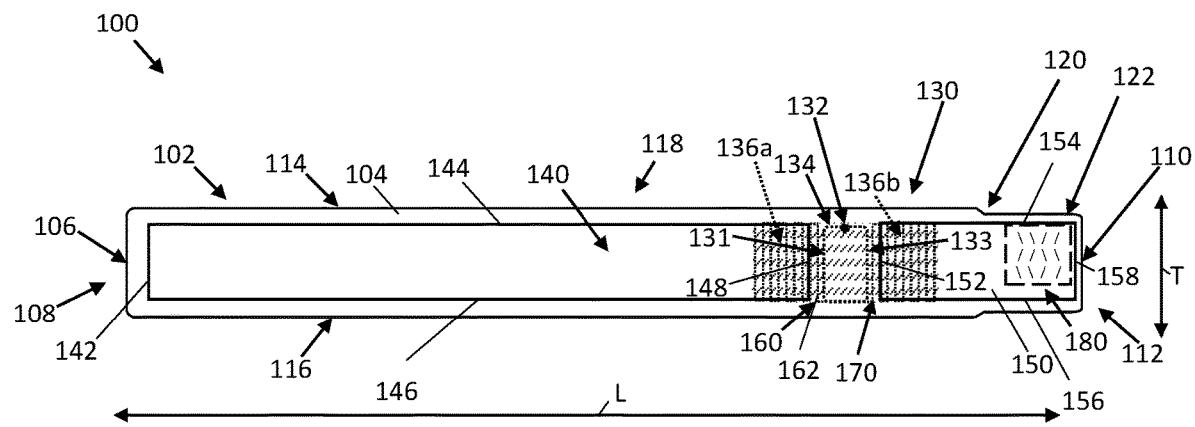
FIG. 1A is a schematic plan view of an example of a wristband in accordance with embodiments of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The components of embodiments of the present disclosure have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Embodiments of the present disclosure are related to systems and/or devices that include a wristband with a radiofrequency identification device (RFID) circuit and provide for enhanced readability of the RFID circuit. The wristband can include one or more conductive elements that can advantageously increase the read range of the RFID circuit and/or can increase the read angle of the RFID circuit and can aid in overcoming the effect and/or impact of radiofrequency interference caused by a body of the wearer of the wristband. The conductive elements can extend circumferentially around the wristband when the wristband is wrapped around the wrist, ankle, or other body part of the wearer such that even when the antenna and/or inductive loop of the RFID circuit are obstructed by the wrist or other body part, the readability of the RFID circuit can be improved and/or can be independent of the orientation of the RFID circuit in the wristband.

In accordance with embodiments of the present disclosure, performance of the wristband can be improved by adding a metallic layer to the back of the non-flagged wristband. Adding a metal layer overlapping the antenna of the RFID circuit and extending around the wristband can effectively extend the antenna. This can be achieved by adding a metallic layer up to but not covering the impedance matching loop. Using a single metallic strip or multiple parallel metallic strips both improved the performance similarly. The metallic layer can be added by thermal transfer printing with metallic ribbon, foil stamping, laminating metalized polyester labels, and/or via other techniques. In some instances, the antenna of the RFID circuit can be configured and dimensioned to improve readability performance of the wristband.

In accordance with embodiments of the present disclosure, a device is disclosed that includes a wristband, an RFID circuit, and an elongated conductive element. The wristband has a flexible elongated body. The wristband has an open state in which the wristband is capable of being positioned in a planar configuration and has a closed state in which the wristband is wrapped in a loop such that a first end of the wristband overlaps a second end of the wristband and is fixed to the body of the wristband. The RFID circuit is supported by the elongated body of the wristband and is positioned on the body such that the RFID circuit is configured to be included in the loop when the wristband is in the closed state. The elongated conductive element is supported by the elongated body of the wristband and is positioned on the body such that the elongated conductive element is configured to be included in the loop when the wristband is in the closed state. The elongated conductive element is spaced away from the RFID circuit and extends circumferentially about the loop in the closed state.

In accordance with embodiments of the present disclosure, a method is disclosed. The method includes supporting an RFID circuit on an elongated flexible body of a wristband. The wristband has an open state in which the wristband is capable of being positioned in a planar configuration and has a closed state in which the wristband is wrapped in a loop such that a first end of the wristband overlaps a second end of the wristband and is fixed to the body. The RFID circuit is positioned on the body such that the RFID circuit is configured to be included in the loop when the wristband is in the closed state. The method also includes supporting an elongated conductive element on the elongated body of the wristband. The elongated conductive element is positioned on the body such that the elongated conductive element is configured to be included in the loop when the wristband is in the closed state. The elongated conductive element is spaced away from the RFID circuit and extends circumferentially about the loop in the closed state.

In accordance with embodiments of the present disclosure, the body is formed by a substrate that has a first surface and a second surface opposite the first surface, where a thickness of the substrate is measured between the first and second surfaces. The RFID circuit and the conductive element can be disposed on the first surface and can be spaced away from each other by a gap and a dielectric material can be in the gap. Alternatively, the RFID circuit can be disposed on the first surface and the conductive element can be disposed on the second surface and the RFID circuit and the conductive element can be spaced away from each other by at least the thickness of substrate. A dielectric material can be disposed between the RFID circuit and the conductive element. The dielectric material can be part of the substrate.

In accordance with embodiments of the present disclosure, the conductive element extends between a proximal end of the body and a proximal end of the RFID circuit. A further conductive element can be positioned on the body such that the further conductive element is configured to be included in the loop when the wristband is in the closed state. The further conductive element is spaced away from the RFID circuit and extends circumferentially about the loop in the closed state. The conductive element can extend between a proximal end of the body and a proximal end of an inductive loop of the RFID circuit and the further conductive element can extend between a distal end of the body and a distal end of the inductive loop of the RFID circuit. The RFID circuit and the further conductive element can be spaced away from each other by a further gap, which can include the dielectric material.

In accordance with embodiments of the present disclosure, the conductive element can be at least one strip of conductive material. The conductive material is at least one of metal, conductive ink, conductive threads, graphene, or graphite.

In accordance with embodiments of the present disclosure, the device can include a further substrate and the RFID circuit and the conductive element can be disposed between the substrate and the further substrate.

In accordance with embodiments of the present disclosure, the conductive element extends circumferentially about the loop by approximately ninety (90) degrees to approximately seven hundred twenty (720) degrees, by approximately one-hundred thirty-five (135) degrees to approximately seven hundred twenty (720) degrees, or by approximately one-hundred eighty (180) degrees to approximately seven hundred twenty (720) degrees.

In accordance with embodiments of the present disclosure, in response to exposure of the wristband to radiofrequency waves within a specified frequency range, the conductive element increases a power induced in the RFID circuit.

In accordance with embodiments of the present disclosure, at least one of a read range or a read angle of the RFID circuit can be increased by the conductive element.

Figure 1B:
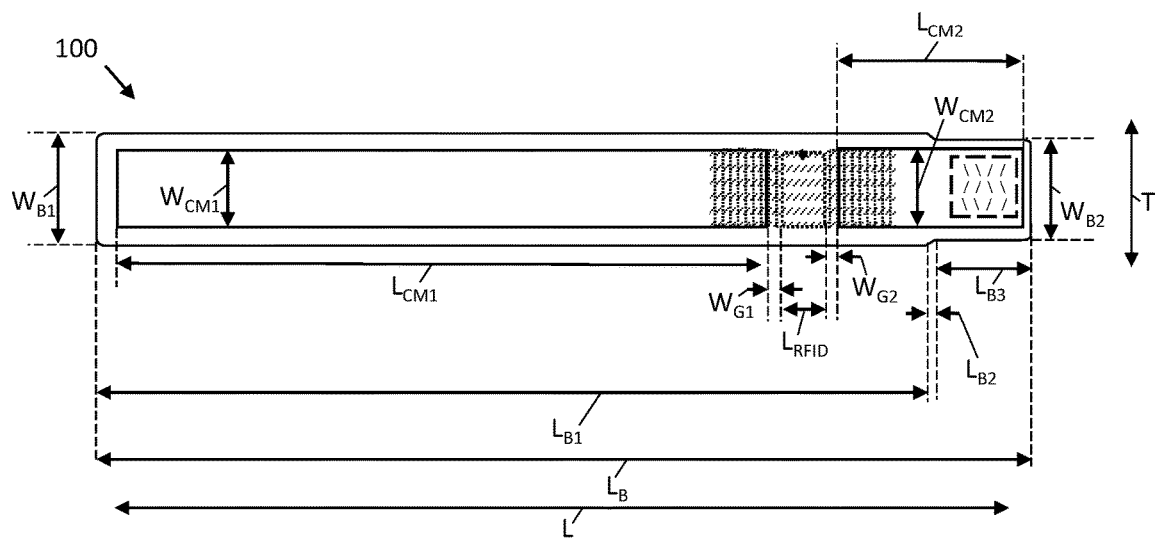
FIG. 1B is a schematic plan view of an example of a wristband in accordance with embodiments of the present disclosure.
Figure 1C:
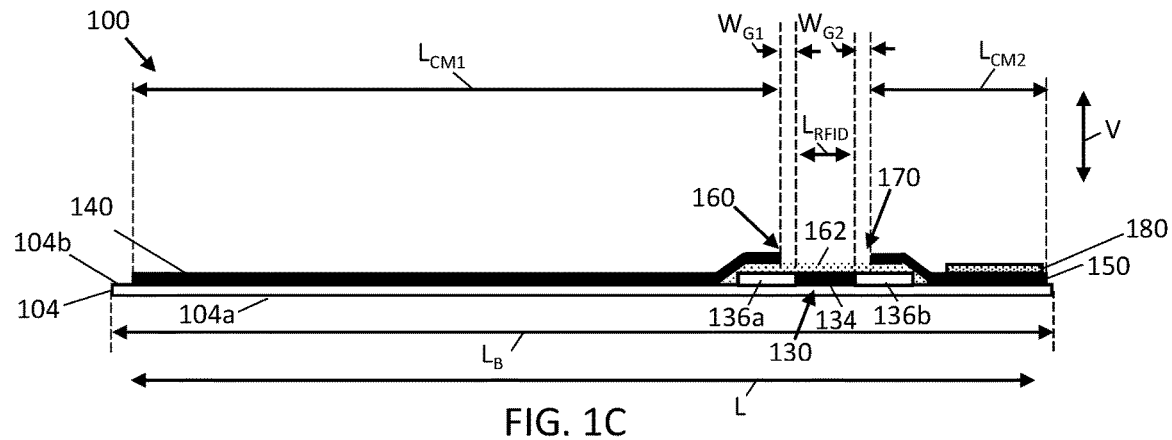
FIG. 1C is a schematic profile view of an example of a wristband in accordance with embodiments of the present disclosure.
Figure 14:
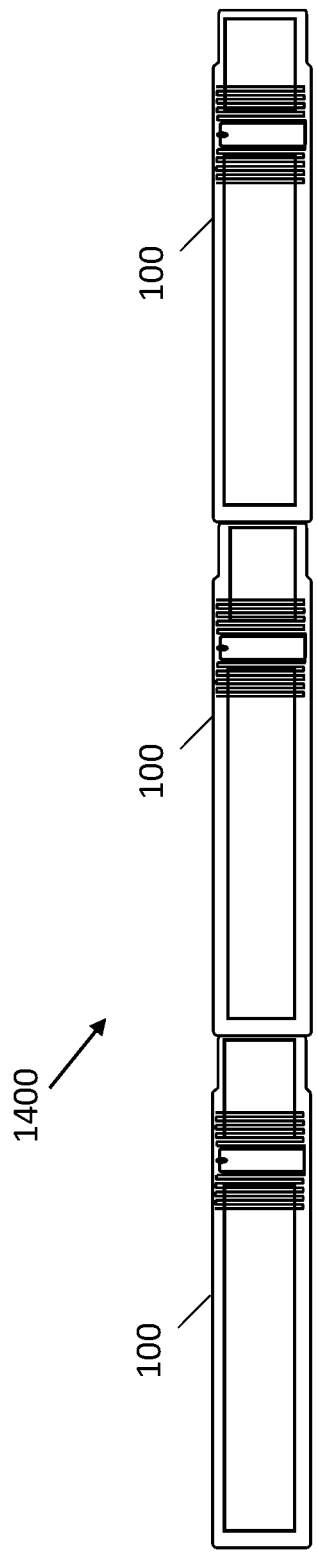
FIG. 14 illustrates an example web of wristbands in accordance with embodiments of the present disclosure.
Figure 15:
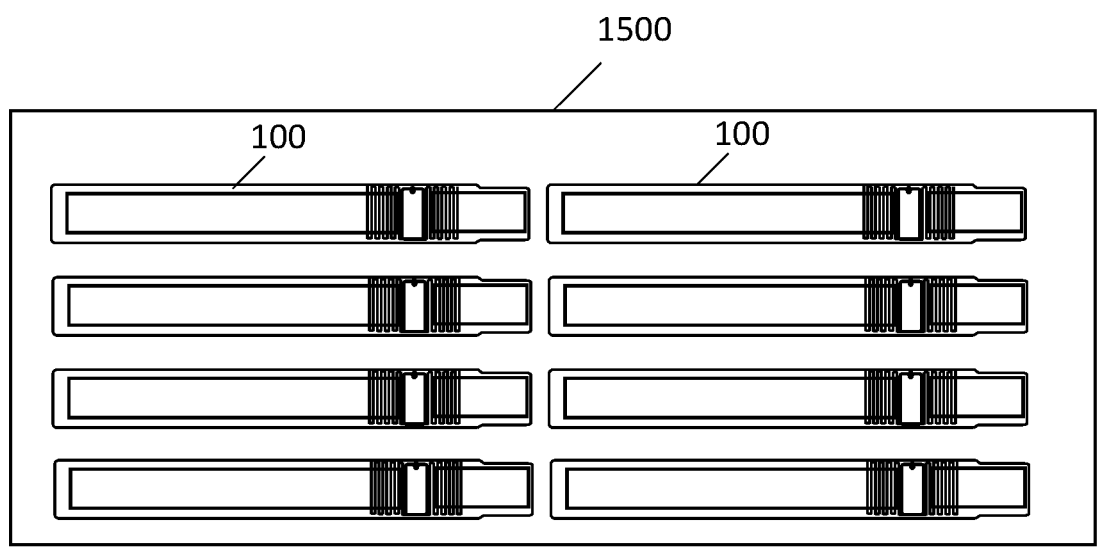
FIG. 15 illustrates an example sheet of wristbands in accordance with embodiments of the present disclosure.

FIGS. 1A-C illustrate an example embodiment of a wristband or band 100 in an open position in accordance with embodiments of the present disclosure. FIGS. 1A-B are schematic plan views of the example wristband 100 and FIG. 1C is a schematic profile view of the example wristband 100. The wristband 100 can have an elongated body 102, shown in FIGS. 1A-C in an open state in which the wristband 100 is capable of being positioned in a planar configuration. The body 102 can be formed from a flexible substrate 104. As an example, the substrate 104 can be formed from one or more of paper, elastomers polymers, and/or any combination thereof. Polymers used to form the substrate 104 can include, for example, polyesters, thermoplastic and/or vinyl polymers, such as polypropylene, polyethylene, polyethylene terephthalate, nylon, and/or Tyvek®, and/or any combination thereof. The substrate 104 or at least a portion thereof provides a printable surface 104a, e.g., via thermal printing by a thermal printer. The wristband can be provided individually and/or multiple wristbands 100 can be stored in a web 1400 of wristbands where the wristbands are aligned end-to-end, as shown in FIG. 14, and/or can be stored in a sheet 1500 of wristbands 100 where the wristbands 100 are distributed on the sheet, as shown in FIG. 15. The print on the substrates 104 of the wristbands 100, the web 1400 and/or sheet 1500 can be fed through a printer.

The wristband 100 can be wrapped about an arm or wrist of a wearer (e.g., a human wearing the wristband). While the wristband 100 can be wrapped about the arm or wrist of the wearer, the wristband 100 can be also be wrapped about other parts of the human body, such as a leg or an ankle, and/or can be wrapped about parts of animal's bodies, such as legs, neck, and/or other parts of the body.

Figure 10A:
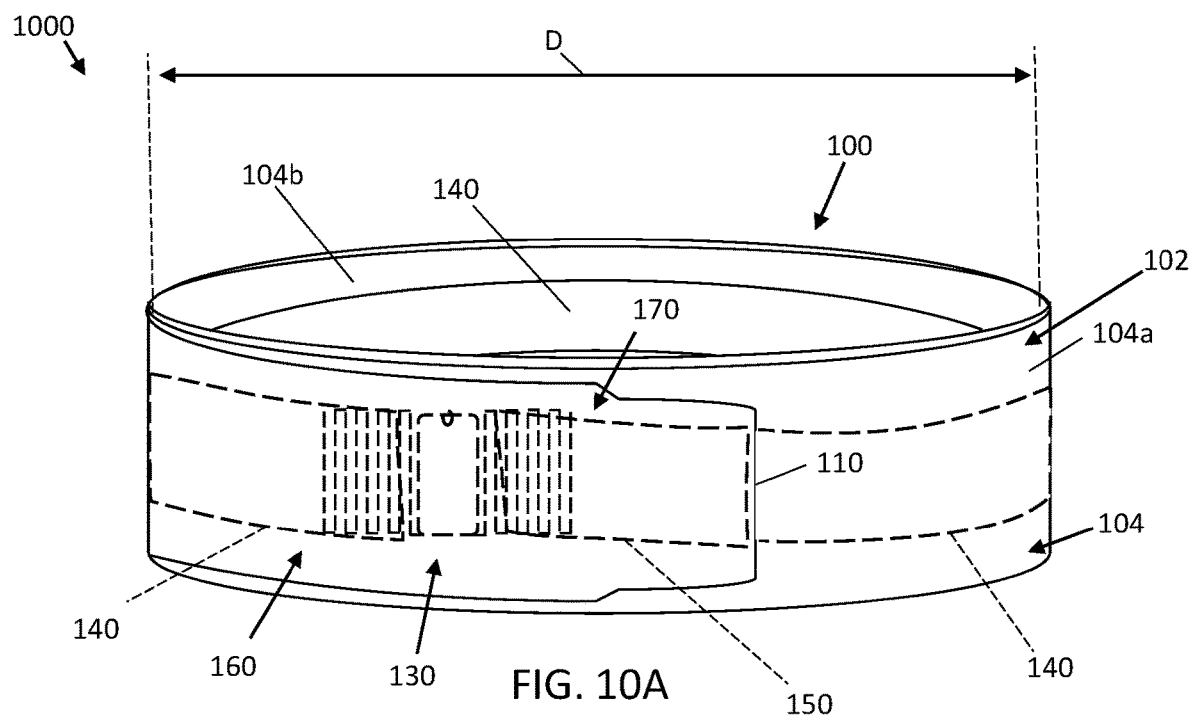
FIG. 10A-B illustrates an embodiment of an example wristband in a closed state in which the wristband is wrapped in a loop in accordance with embodiments of the present disclosure.
Figure 10B:
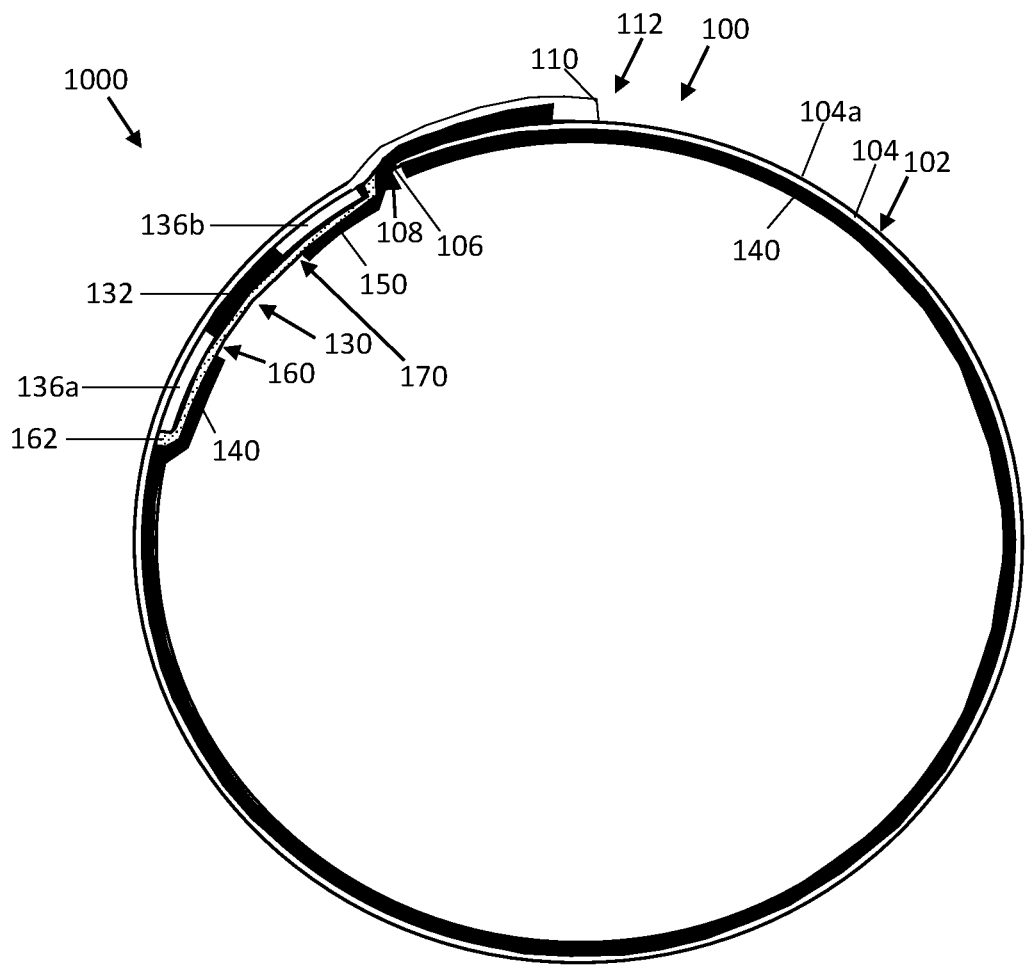
Figure 10C:
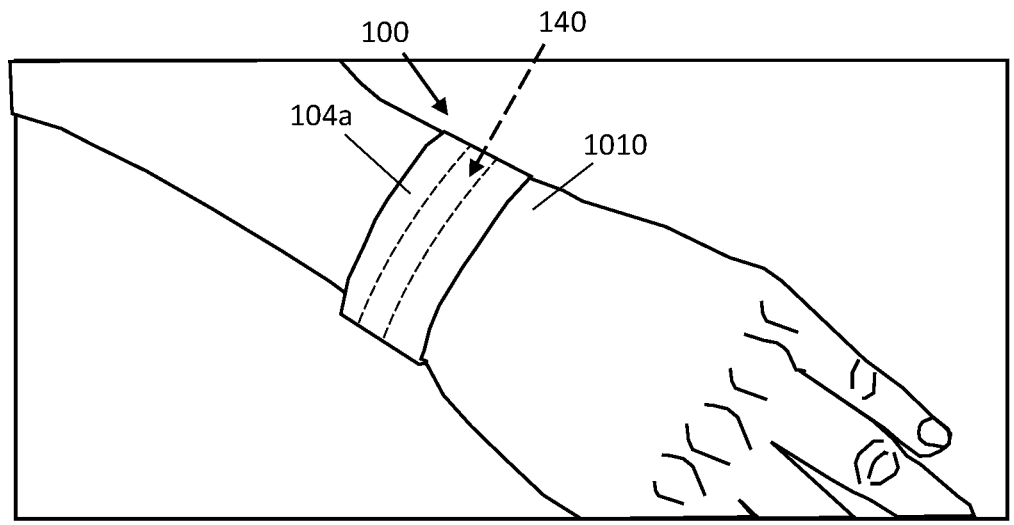
FIG. 10C illustrates an embodiment of an example wristband in a closed state in which the wristband is wrapped in a loop about a wrist of a wearer in accordance with embodiments of the present disclosure.

The body 102 can have a length $L_B$ measured along a longitudinal axis L from a terminal end 106 at a proximal end 108 of the body 102 to a terminal end 110 at a distal end 112. As used herein, proximal ends generally refer to ends of components on the left side in the orientation illustrated in FIGS. 1A-B and distal ends generally refer to ends of components on the right side in the orientation illustrated in FIGS. 1A-B. The length $L_B$ of the body 102 can be, for example, approximately five (5) inches to approximately sixteen (16) inches. As shown in FIGS. 1A-C, the wristband 100 can have a first state in which the wristband 100 can be positioned in a planar configuration where the terminal ends 106 and 110 can be free. As shown in FIGS. 10A-C, the wristband 100 can have a second state in which the wristband is fixed in loop 1000 (e.g., where the wristband 100 is looped around itself and at least one of the terminal ends 106 or 110 is fixed or fastened to the body 102) to wrap the wristband 100 about a wearer of the wristband 100. The body 102 can have a width $W_{B1}$ measured along a transverse axis T at the proximate end 108 of the body 102 from an edge 114 to an edge 116 of the body 102 and can have a width $W_{B2}$ measured along the transverse axis T at the distal end 112 of the body 102 from the edge 114 to the edge 116 of the body 102. A thickness of the wristband can be measured along a vertical axis V. The transverse axis T, the longitudinal axis L, and the vertical axis V are each perpendicular to each other. While the width $W_{B2}$ is less the width $W_{B1}$ in the illustrated example embodiment, the width $W_{B2}$ can be equal to or greater than the width $W_{B1}$ in accordance with embodiments of the present disclosure. For embodiments where the width $W_{B2}$ is equal to the width $W_{B1}$, the body can have a rectangular perimeter with a uniform width along the longitudinal axis L from the terminal end 106 to the terminal end 110.

The body 102 can be contoured along the body length $L_B$ defining a first region 118 having a first body length $L_{B1}$ extending along the longitudinal axis L from terminal end 106 to a proximal end of a second region 120, which coincides with a distal end of the first region 118. The second region 120 can have a second body length $L_{B2}$ extending along the longitudinal axis L from the proximal end of the second region 120 to a distal end of the second region 120, which coincides with a beginning or proximal end of a third region 122 having a third body length $L_{B3}$ extending along the longitudinal axis L from the distal end of the second region 120 to the terminal end 110. A width of the second region 120 measured along the transverse axis T between the edges 114 and 116 can be tapered from the proximal end to the distal end of the second region 120 such that the width of the second region 120 decreases from the width $W_{B1}$ at the proximal end of the second region 120 to the width $W_{B2}$ at the distal end of the second region 120 (or alternatively increases for embodiments in which $W_{B2}$ is greater than $W_{B1}$). A sum of the first through third body lengths ($L_{B1}$+$L_{B2}$+$L_{B3}$) is equal to the length $L_B$ of the body 102 ($L_B$=$L_{B1}$+$L_{B2}$+$L_{B3}$). While the body 102 is illustrated as having a generally rectangular perimeter, the body 102 can have differently shaped perimeters and/or the width $W_{B1}$ and/or $W_{B2}$ can vary or be non-uniform along the longitudinal axis L.

Figure 8A:
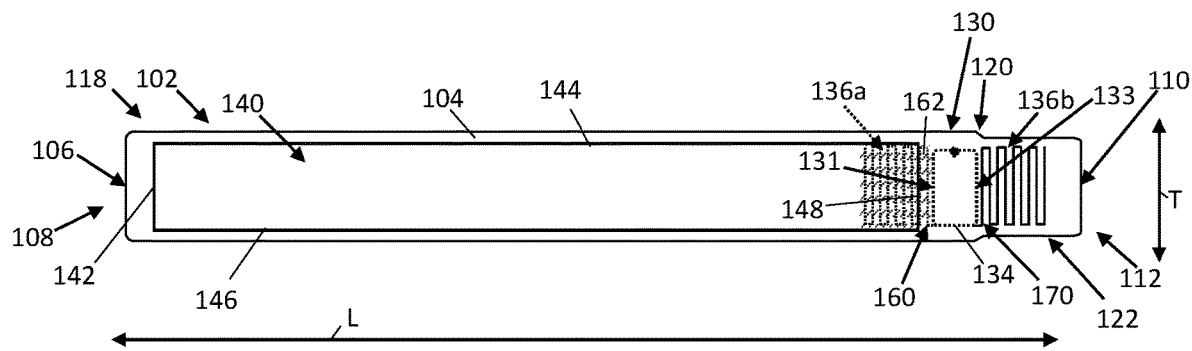
FIG. 8A is a schematic plan view of an example of a wristband in which the RFID circuit is positioned proximate to a distal end of a body of the wristband and a conductive element extends between the RFID circuit and a proximal end of the body in accordance with embodiments of the present disclosure.

A radiofrequency identification device (RFID) circuit 130 can be supported by the body 102. The RFID circuit 130 includes an electronic circuit 132, an inductive loop 134, and antennas 136a-b, which in the present example are illustrated as dipole antennas having a serpentine configuration. While the antennas 136a-b are illustrated as being dipole antennas having a serpentine configuration, embodiments of the present disclosure can include different types of antennas and/or different antenna configurations or geometries. The RFID circuit 130 can be embodied as an RFID inlay, transponder, tag, or other form factor. A length of the antennas 136a-b can be specified or tuned based on a wavelength of the radiofrequency communication to be received and/or transmitted by the RFID circuit 130. As an example, the length of the antennas 136a-b can be equal to the wavelength, a fraction of the wavelength, such as three quarters of the wavelength, one half of the wavelength, one quarter of the wavelength, one eighth of the wavelength, or other fractions of the wavelength. A length $L_{RFID}$ of the RFID circuit 130 is measured along the longitudinal axis L between the terminal ends of the antennas 136a-b of the inductive loop 134. The RFID circuit 130 is positioned in the first region 118 of the body 102 and the length $L_{RFID}$ is greater than the length $L_{B2}$ of the second region 120, greater than the length $L_{B3}$ of the third region 122, and less than the length $L_{B1}$ of the first region 118. While the RFID circuit 130 is illustrated as being positioned in the first region 118, the RFID circuit 130 or a portion thereof can be positioned in the first region 118, the second region 120 and/or the third region 122, e.g., as shown in FIG. 8A, which also illustrates a wrist band that include the conductive element 140 and is devoid of the conductive element 150. A width of the RFID circuit 130 measured along the transverse axis T can be equal to or less than the width $W_{B1}$ of the first region 118 and/or can be equal to, less than, or greater than the width $W_{B2}$ of the third region 122.

The RFID circuit 130 can be readable as described herein by a corresponding radiofrequency device, such as an RFID reader/interrogator. The RFID circuit 130 can be an ultra-high frequency (UHF) RFID circuit configured for far-field radiofrequency communication (e.g., in a frequency range of approximately 860 MHz to approximately 960 MHz). As a non-limiting example, the RFID circuit 130 can be configured according to one or more proprietary schemes and/or according to one or more standards, such as ISO 18000-6A, ISO 18000-6B, ISO 18000-6C, ISO/IEC 29143, and/or other standards. The electronic circuit 132 can be electrically connected to the inductive loop 134, which in turn can be electrically coupled to the antennas 136a-b, and the electronic circuit 132 can be operative to respond to a far-field radiofrequency communication via the inductive loop 134 and antennas 136a-b. The RFID circuit 130 can be a passive RFID circuit and the inductive loop 134 can power the electronic circuit 132 via inductive coupling in response to radiofrequency waves, e.g., emitted by the RFID reader/interrogator, which induce an electric current in the antennas 136a-b and the inductive loop 134. An example RFID circuit 130 is described herein with reference to FIG. 12.

The body 102 can also support one or more conductive elements 140 and/or one or more conductive elements 150 that are spaced away or separated from the electronic circuit 132, inductive loop 134, and antennas 136a-b of the RFID circuit 130. The conductive elements 140 and/or 150 can be packaged as a unit with the RFID circuit 130, for example, in an RFID inlay, tag, or transponder or can be a separate and distinct unit or units. Where the conductive elements 140 and/or 150 overlap the RFID circuit 130, e.g., in the vertical direction along the vertical axis V, the conductive elements 140 and/or 150 can be separated from the RFID circuit 130 by a nonconductive material, electrical insulator, or dielectric material 162. For embodiments in which the RFID circuit is included in the RFID inlay and the conductive elements 140 and/or 150 are not, the housing or packing of the RFID inlay can form the non-conductive, electric insulator, or dielectric material 162. As an example, the dielectric material 162 can be disposed between the antennas 136a-b and the conductive elements 140 and/or 150 and/or can be disposed over the electronic circuit 132 and the inductive loop 134. The conductive elements 140 and/or 150 can be strips of electrically conductive material having one or more configurations or patterns. The conductive materials can include, for example, strips of one or more metals, conductive ink, conductive threads, conductive adhesives, organic materials, such as graphene or graphite, and/or other conductive materials. The conductive elements 140 and/or 150 can be added, for example, by thermal transfer printing with metallic ribbon, foil stamping, and/or laminating metalized polyester labels. The conductive element 140 can have a length $L_{CM1}$ measured along the longitudinal axis L and a width $W_{CM1}$ measured along the transverse axis T and the conductive element 150 can have a length $L_{CM2}$ measured along the longitudinal axis L and a width $W_{CM2}$ measured along the transverse axis T. The conductive element 140 is positioned in the first region 118 of the body 102 and the length $L_{CM1}$ and width $W_{CM1}$ of the conductive element 140 can be less than the length $L_{B1}$ and width $W_{B1}$, respectively, of the first region 118 such that the conductive element 140 can be offset inwardly from the terminal end 106, the edges 114 and 116, and the proximal end of the second region 120. The length $L_{B1}$ can be greater than the lengths $L_{B2}$ and $L_{B3}$ of the second and third regions 120 and 122, respectively, and/or can be greater than the length $L_{RFID}$ of the RFID circuit 130. While the example embodiment illustrates the conductive element 140 as being offset inwardly from the terminal end 106 and the edges 114 and 116, the conductive element 140 can be configured and dimensioned such that a proximal end 142 of the conductive element 140 can be aligned with the terminal end 106 of the body 102, an edge 144 of the conductive element 140 can be aligned with the edge 114 of the body, and/or an edge 146 of the conductive element 140 can be aligned with the edge 116 of the body 102. In some embodiments, the width $W_{CM1}$ can be equal to the width $W_{B1}$ such that the edges 144 and 146 coincide with the edges 114 and 116, respectively, of the body 103. A distal end 148 of the conductive element 140 can be positioned adjacent to a proximal end 131 of the inductive element 134 and can overlap at least a portion of the antenna 136a, e.g., stacked in the vertical direction along the vertical axis V. A gap 160 can exist between distal end 148 of the conductive element 140 and the proximal end 131 of the inductive loop 134. The gap 160 between the conductive element 140 and the RFID circuit 130 can have a gap width $W_{G1}$ measured along the longitudinal axis L. The gap width $W_{G1}$ is greater than zero millimeters. As an example, the gap width can be approximately one hundredth of a millimeter to approximately twelve millimeters. The RFID circuit 130 can be devoid of any feed lines or any physical electrically conductive connections to the conductive element 140, the RFID circuit 130 and the conductive element 140 are not in direct contact with each other, and/or the conductive element 140 does not overlap the inductive loop 134. The gap 160 can include the dielectric material 162. In some embodiments, a dielectric material 162 can overlay the electronic circuit 132, the inductive loop 134, and/or the antennas 136a-b of the RFID circuit 130 such that the RFID circuit 130 is disposed between the substrate 104 and the dielectric material 174.

The conductive element 150 is positioned across the first, second, and/or third regions 118, 120, and 122, respectively, of the body 102. The length $L_{CM2}$ of the conductive element 150 can be less than the length $L_{B1}$ of the first region, can be greater than the length $L_{B2}$ of the second region, and can be greater than the length $L_{B3}$ of the third region 122. The width $W_{CM2}$ of the conductive element 150 can be less than the width $W_{B1}$ of the first region 118 and can be less than the width $W_{B2}$ of the third region 122. The conductive element 150 can be offset inwardly from the terminal end 110 and the edges 114 and 116, and a proximal end 152 of the conductive element 150 can be adjacent to a distal end 133 of the inductive loop 134 and can overlap at least a portion of the antenna 136b, e.g. stacked in the vertical direction along the vertical axis V. The length $L_{CM2}$ can be less than the length $L_{RFID}$ of the RFID circuit 130. While the example embodiment illustrates the conduct element as being offset inwardly from the terminal end 110 and the edges 114 and 116, the conductive element 150 can be configured and dimensioned such that a distal end 158 of the conductive element 150 can be aligned with the terminal end 110 of the body 102, an edge 154 of the conductive element 150 is aligned with the edge 114 of the body 102, and/or an edge 156 of the conductive element 150 is aligned with the edge 116 of the body 102. In some embodiments, the width $W_{CM2}$ can be equal to the width $W_{B2}$ and/or $W_{B1}$ such that the edges 154 and 156 coincide with the edges 114 and 116, respectively, of through the first, second, and/or third regions 118, 120, 122 of the body 103. A gap 170 can exist between proximal end 152 of the conductive element 150 and the distal end 133 of the inductive loop 134. The gap 170 between the conductive element 150 and the inductive loop 134 can have a gap width $W_{G2}$ measured along the longitudinal axis L.

The gap width $W_{G2}$ is greater than zero millimeters. For example, the gap width $W_{G2}$ can be approximately one hundredth of a millimeter to approximately twelve millimeters. The RFID circuit 130 can be devoid of any feed lines or any electrically conductive connections to the conductive element 150, the RFID circuit 130 and the conductive element 150 are not in direct contact with each other, and/or the conductive element 150 does not overlap the inductive loop 134. The gap 170 can be devoid of electrically conductive material and/or the gap 170 can include a dielectric material 162.

Figure 1D:
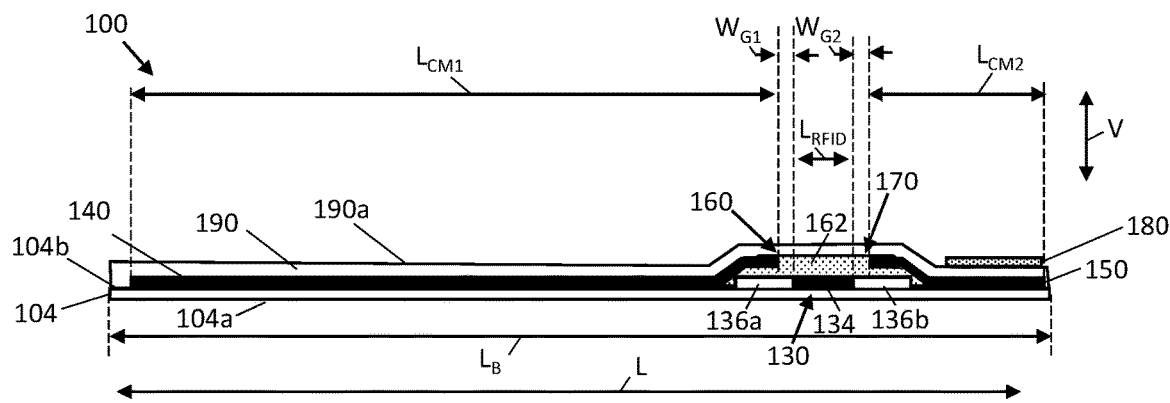
FIG. 1D is another schematic profile view of an example of a wristband in accordance with embodiments of the present disclosure.
Figure 1E:
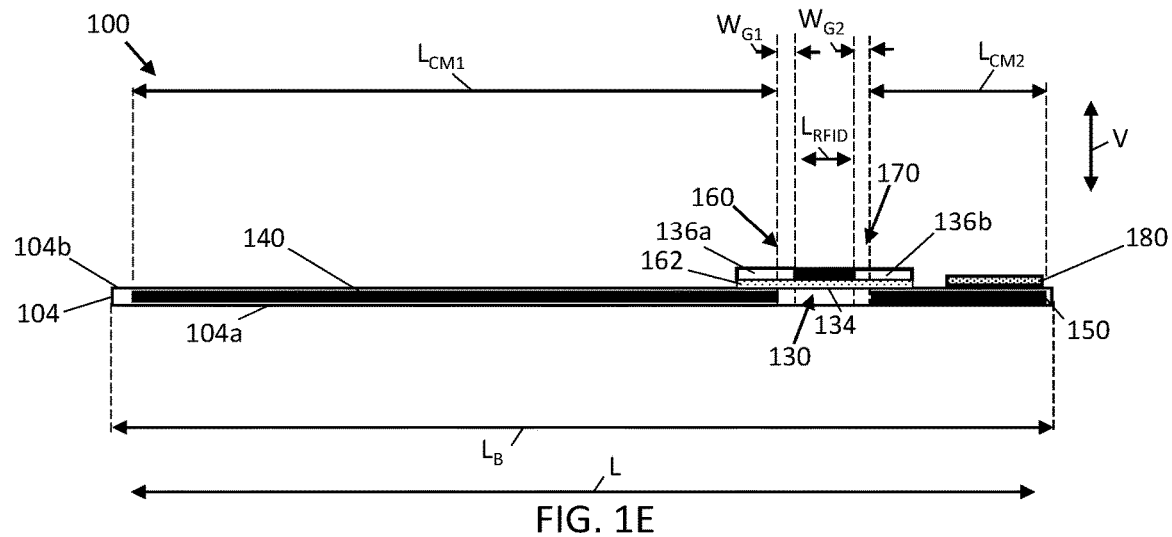
FIG. 1E is another schematic profile view of an example of a wristband in accordance with embodiments of the present disclosure.
Figure 1F:
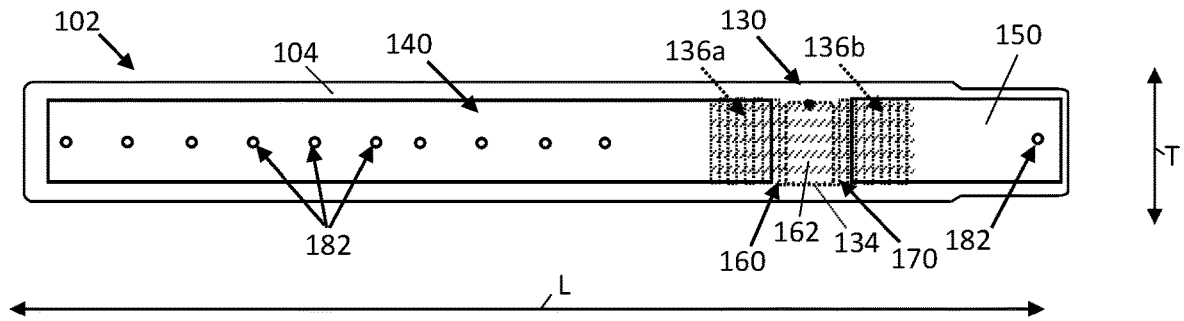
FIG. 1F is a schematic plan view of an example of a wristband in accordance with embodiments of the present disclosure.
Figure 2:
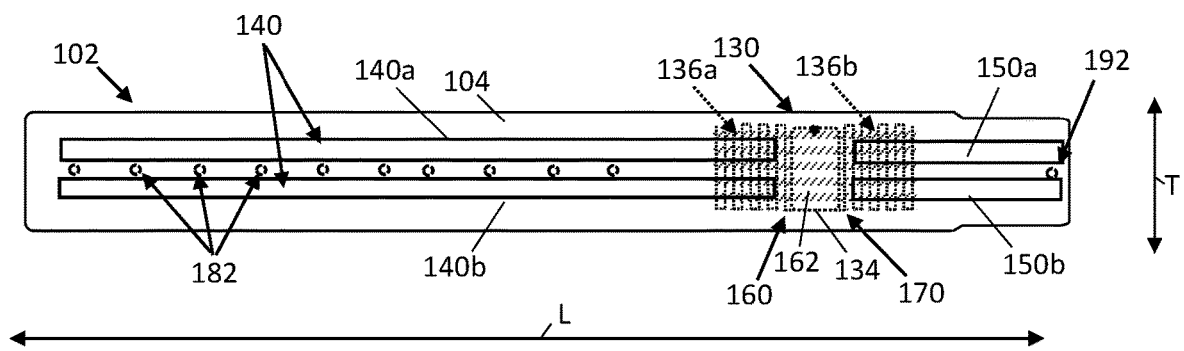
FIG. 2 is a schematic plan view of an example configuration of conductive elements of an example wristband including two strips of conductive material in accordance with embodiments of the present disclosure.
Figure 3:
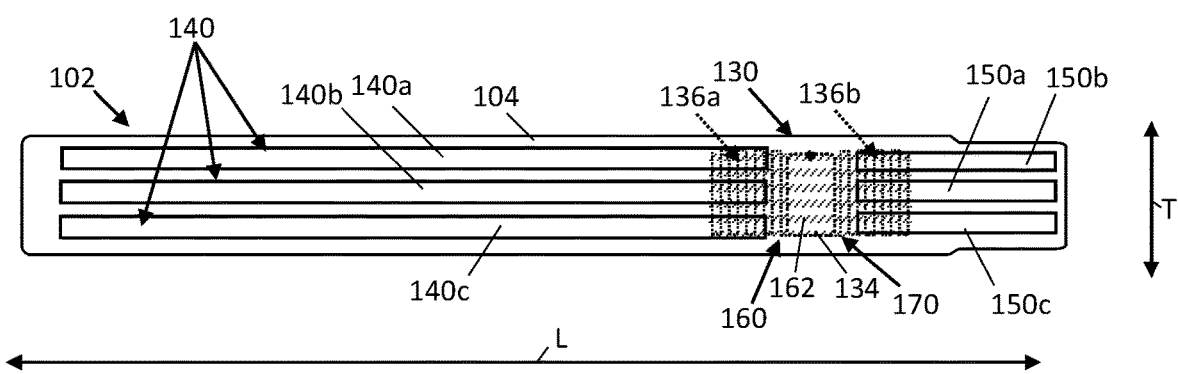
FIG. 3 is a schematic plan view of an example configuration of conductive elements of an example wristband including three strips of conductive material in accordance with embodiments of the present disclosure.
Figure 4:
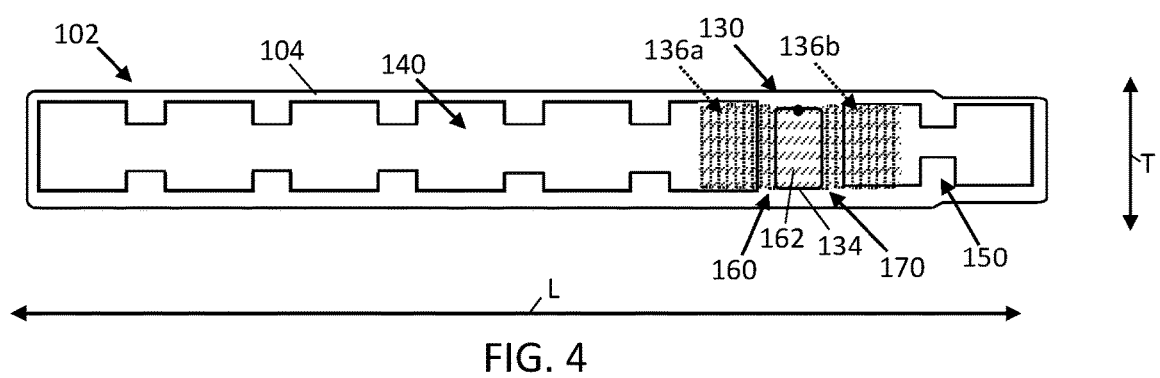
FIG. 4 is a schematic plan view of an example configuration of conductive elements of a wristband including a strip of conductive material having a crenellated, castellated, or scalloped pattern in accordance with embodiments of the present disclosure.
Figure 5:
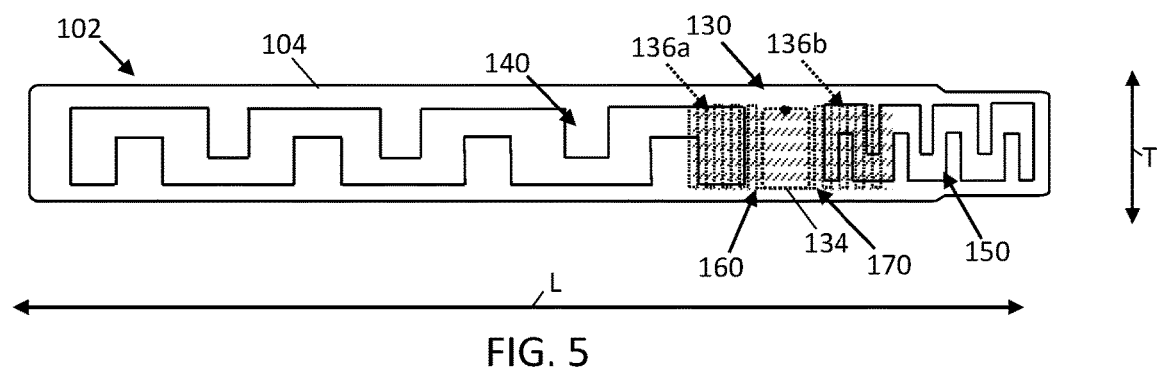
FIG. 5 is a schematic plan view of an example configuration of conductive elements of a wristband including a strip of conductive material having a serpentine pattern in accordance with embodiments of the present disclosure.

The conductive elements 140 and/or 150 can have a variety of different configurations, including linear configurations, nonlinear configurations, symmetrical configurations, asymmetrical configurations, other configurations, and/or a combination of configurations. As an example, FIGS. 1A-B illustrate the conductive elements 140 and 150 as strips of electrically conductive material with straight, linear, and uniform rectangular areas. As another example, FIG. 2 illustrates the wristband 100 except that the conductive elements 140 and 150 include two spaced apart parallel strips of electrically conductive material 140a-b and 150a-b having lengths $L_{CM1}$ and $L_{CM2}$, respectively, extending along the longitudinal axis L with straight, linear, and uniform rectangular areas. As another example, FIG. 3 illustrate the wristband 100 except that the conductive elements 140 and 150 each include three spaced apart parallel strips of electrically conductive material 140a-c and 150a-c having lengths $L_{CM1}$ and $L_{CM2}$, respectively, extending along the longitudinal axis L with straight, linear, and uniform rectangular areas. As another example, FIG. 4 illustrates the wristband 100 except that the conductive elements 140 and 150 are each strips of electrically conductive material having lengths $L_{CM1}$ and $L_{CM2}$, respectively, extending along the longitudinal axis L with a crenellated, castellated, or scalloped pattern. As another example, FIG. 5 illustrates the wristband 100 except that the conductive elements 140 and 150 are each strips of electrically conductive material having lengths $L_{CM1}$ and $L_{CM2}$, respectively, extending along the longitudinal axis L with a serpentine pattern. Unless other stated herein, the configurations of the conductive elements 140 and/or 150 illustrated in FIGS. 2-5 can be interchangeable with the configuration of conductive elements 140 and/or 150 illustrated in FIG. 1 and it should be understood that reference to the wristband 100, the conductive element 140, the conductive element 150 herein encompasses any of the conductive element configurations or combination of conductive element configurations described herein. While certain conductive element configurations have been illustrated, different configurations can be implemented in accordance with embodiments of the present disclosure.

One or more coatings can be applied to the substrate 104, the RFID circuit 130, the conductive element(s) 140, and/or the conductive element(s) 150. As a non-limiting example, the one or more coatings can include a silver antimicrobial coating, a varnish, and/or a soft feel coating.

The RFID circuit 130, the conductive element(s) 140, and/or the conductive element(s) 150 can be adhered, welded, laminated, printed, or otherwise bonded to the substrate 104. The RFID circuit 130, the conductive element(s) 140, and the conductive element(s) 150 of the wristband 100 can be disposed on the same surface of the substrate 104 (e.g., surface 104b) as shown in FIG. 1C such that when the wristband 100 is in a planar configuration, the RFID circuit 130 and at least a portion of the conductive elements 140 and/150 are coplanar. As shown in FIG. 1D, the RFID circuit 130, the conductive element(s) 140, and the conductive element(s) 150 of the wristband 100 can alternatively be disposed between the substrate 104 and another substrate 190 such that the RFID circuit 130, the conductive element(s) 140, and/or the conductive element(s) 150 are encompassed or at least partially encompassed by the substrates 104 and 190. The substrate 190 or at least a portion thereof provides a printable surface 190a, e.g., via thermal printing. In some embodiments, the conductive element(s) 140 and/or 150 of the wristband 100 can alternatively be embedded in or integrally formed with the substrate 104 as shown in FIG. 1E and the conductive elements 140 and/or 150 can be separated from the electronic circuit 132, the inductive loop 134, and/or the antennas by a portion of the substrate and/or the dielectric material 162.

Referring to FIGS. 1C, the wristband 100 can include an adhesive 180 disposed at the terminal end 110, which can be used to affix the terminal end 110 to the body 102 to form a loop with the wristband 100 as shown, e.g., in FIGS. 10A-B. The terminal end 110 and the adhesive 180 can form a tamper evident tab. The adhesive 180 can be disposed on the conductive element 150 and/or can be disposed on the surface 104a or 140b of the substrate 104 (or the substrate 190). Additionally, or in the alternative, the wristband 100 can include holes 182 along a length of the wristband 100 as shown in FIG. 1F and FIG. 2. One of the holes 182 at the distal end 110 can be aligned with another one of the holes 182 along the body 102 when the wristband 100 in placed in a loop and a clip can passed through the aligned holes 182 and secured to the wristband to affix the wristband in a loop. Alternatively, the clip can be formed at the distal end 110 and can mate with the holes 182 long the length $L_B$ of the wristband 100. The holes 182 can pass through the substrate 104 (and/or the substrate 190) and/or the conductive elements 140 and/or 150 as shown in FIG. 1F (or can pass through the substrate 104 without passing through the conductive elements 140a-b and 150a-b as shown in FIG. 2, where the holes are disposed between the two parallel strips of conductive material). Any of the wristbands illustrated in FIGS. 1-10 can include the holes 182 and/or adhesive 180. Where neither the holes 182 nor the adhesive 180 is illustrated, the holes 182 and/or adhesive 180 has been omitted to allow the conductive elements to be viewed without being obscured. Additionally, while the adhesive 180 has been illustrated in an example position on the wrist band, the adhesive can be positioned in other locations in accordance with embodiments of the present disclosure.

Figure 6:
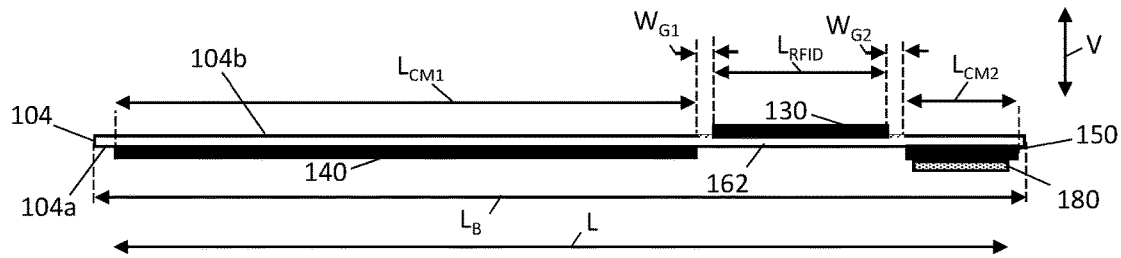
FIG. 6 is a schematic profile view of an example of a wristband in which an RFID circuit is on one side of a substrate and one or more conductive elements are on another side of the substrate in accordance with embodiments of the present disclosure.
Figure 7:
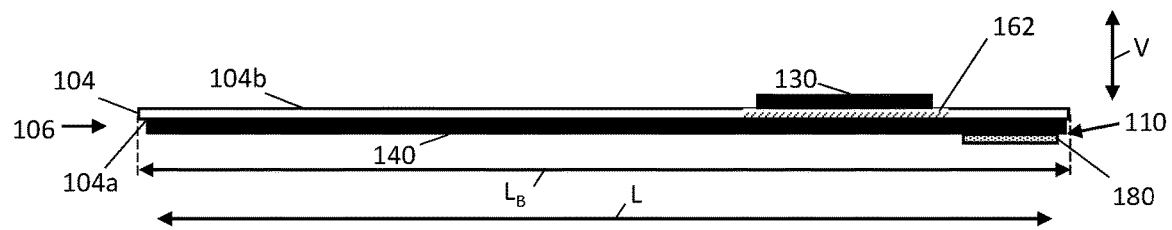
FIG. 7 is a schematic profile view of an example of a wristband in which an RFID circuit is on one side of a substrate and one or more conductive elements are on another side of the substrate and at least a portion of the one or more conductive elements and the RFID circuit are aligned along a vertical axis in accordance with embodiments of the present disclosure.

As shown in FIG. 6, the RFID circuit 130 can be disposed on one surface of the substrate 104 (e.g., surface 104b) and the conductive elements 140 and 150 can be disposed on an opposite surface of the substrate 104 (e.g., surface 104a). By positioning the RFID circuit 130 and the conductive elements 140 and 150 on opposite surfaces of the substrate, the RFID circuit 130 and the conductive elements are separated and spaced away from each other by at least a thickness of the substrate 104 as measured along the vertical axis V between the first and second surfaces 104a and 104b of the substrate 104. The RFID circuit 130 and the conductive elements 140 and/or 150 can be offset and nonoverlapping with each other along in the vertical direction defined by the vertical axis V. The dielectric material 162 can also be disposed between the RFID circuit and substrate 104 and/or between the RFID circuit 130 and the conductive elements 140 and/150. In some embodiments, the substrate 104 or a portion of the substrate 104 can include the dielectric material 162 embedded or integrally formed in the substrate 104, as shown in FIG. 7. When the RFID circuit 130 and the conductive elements 140 and 150 are disposed on the different surfaces of the substrate 104 (e.g., surface 104a and 104b) as shown in FIG. 6, and the wristband 100 is in a planar configuration, the RFID circuit 130 and the conductive elements 140 and/or 150 are in different planes and are parallel to each other.

As shown in FIG. 7, the RFID circuit 130 can be disposed on one surface of the substrate 104 (e.g., surface 104b) and the conductive element(s) 140 can be disposed on an opposite surface of the substrate 104 (e.g., surface 104a), where the conductive element 140 extends as continuous strip(s) of electrically conductive material from the terminal end 106 (or proximate to the terminal end 106) to the terminal end 110 (or proximate to the terminal end 110) of the body 102 such that at least a portion of the conductive element(s) 140 are aligned with and disposed opposite the RFID circuit 130 and are stacked along the vertical axis V. By positioning the RFID circuit 130 and the conductive element(s) 140 on opposite sides of the substrate 104, the RFID circuit 130 and the conductive element(s) 140 are separated and spaced away from each other by at least the thickness of the substrate 104. The dielectric material 162 can also be disposed between the RFID circuit 130 and substrate 104 and/or between the RFID circuit 130 and the conductive element(s) 140. In some embodiments, the substrate 104 or a portion of the substrate 104 can include the dielectric material 162 embedded or integrally formed in the substrate 104. When the RFID circuit 130 and the conductive element(s) 140 are disposed on the different surfaces of the substrate 104 (e.g., surface 104a and 104b) as shown in FIG. 7, and the wristband 100 is in the planar configuration, the RFID circuit 130 and the conductive element(s) 140 are in different planes and are parallel to each other.

Figure 8B:
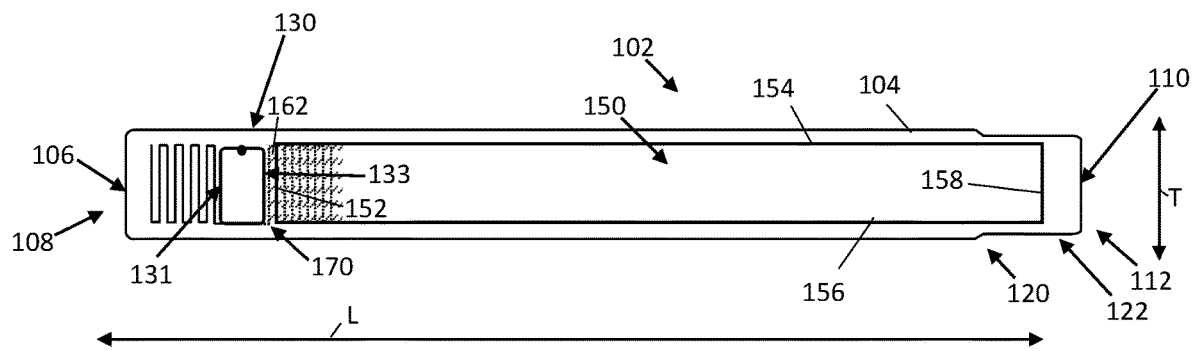
FIG. 8B is a schematic plan view of an example of a wristband in which the RFID circuit is positioned proximate to a proximal end of a body of the wristband and a conductive element extends between the RFID circuit and a distal end of the body in accordance with embodiments of the present disclosure.
Figure 8C:
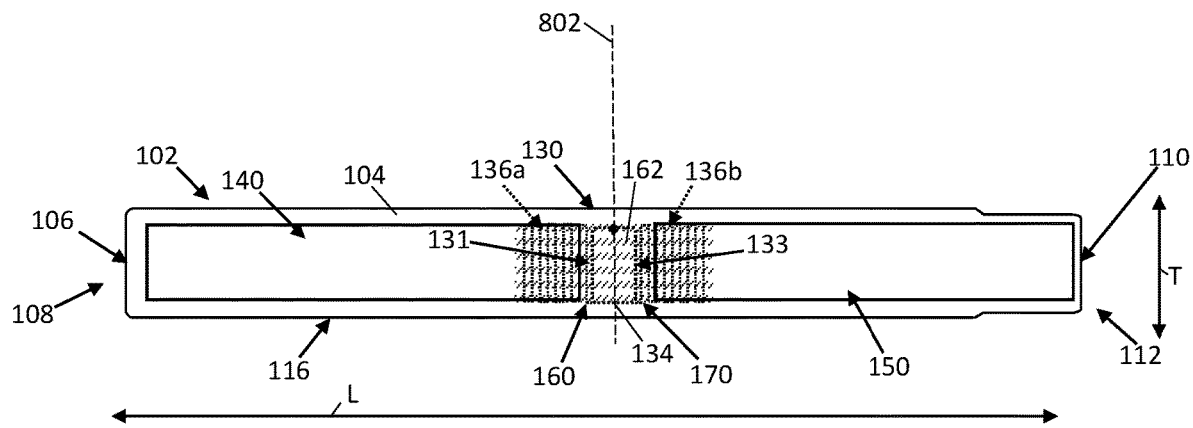
FIG. 8C is a schematic plan view of an example of a wristband in which the RFID circuit is positioned at a midpoint along a length of a body of the wristband and a conductive element extend between the RFID circuit and a proximal end of the body and another conductive element extends between the RFID circuit and a distal end of the body in accordance with embodiments of the present disclosure.

FIGS. 8A-C are schematic plan views of example embodiments of wristbands in accordance with embodiments of the present disclosure. As shown in FIG. 8A, the wristband 100 can be devoid of the conductive element 150 and the distal end 133 of the inductive loop 134 is disposed proximate to the distal end 110 of the body 102. The RFID circuit 130 can span across the first, second, and third regions 118, 120, and 122. The conductive element 140 can extend between the proximal end 106 of the body 102 and the proximal end 131 of the inductive loop 134. The conductive element 140 can be spaced away from the RFID circuit 130 by the gap 160, which may or may not include the dielectric material 162.

As shown in FIG. 8B, the wristband 100 can be devoid of the conductive element 140 and the proximal end 131 of the inductive loop 134 can be disposed proximate to the proximal end 106 of the body 102. The RFID circuit 130 can span a portion of the first region 118. The conductive element 150 can extend between the distal end 133 of the inductive loop 134 and the distal end 110 of the body 102. The conductive element 150 can be spaced away from the inductive loop 134 by the gap 170, which may or may not include the dielectric material 162.

As shown in FIG. 8C, the RFID circuit 130 is disposed about a midpoint 802 along the longitudinal axis L between the proximal end 106 and the distal end 110 of the body 102 (equal in distance from the proximal end 106 and the distal end 110). The RFID circuit 130 can be centered about the midpoint 802. The conductive element(s) 140 can be disposed between the proximal end 106 of the body 102 and the proximal end 131 of the inductive loop 134 and can be spaced away from the RFID circuit 130 by the gap 160, which may or may not include the dielectric material 162. The conductive element(s) 150 can be disposed between the distal end 133 of the inductive loop 134 and the distal end 110 of the body 102 and can be spaced away from the inductive loop 134 by the gap 170, which may or may not include the dielectric material 162. While FIGS. 8A-C illustrate three example positions of the RFID circuit 130 along the length $L_B$ of the body 102, the RFID circuit 130 can be positioned at any location along the length $L_B$ in accordance with embodiments of the present disclosure.

Figure 9:
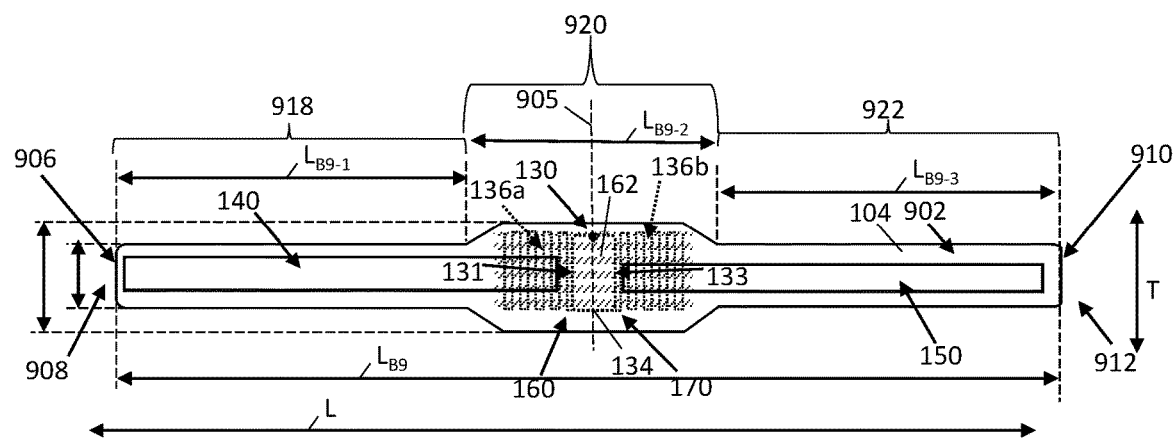
FIG. 9 is a schematic plan view of an example of a wristband in which the RFID circuit is positioned at a midpoint along a length of a body of the wristband, a conductive element extend between the RFID circuit and a proximal end of the body, another conductive element extends between the RFID circuit and a distal end of the body, and width of the body at the midpoint is great than a width of the body at the proximal and distal ends of the body in accordance with embodiments of the present disclosure.

FIG. 9 is a schematic plan view of an example embodiment of a wristband 900 in accordance with embodiments of the present disclosure. A body 902 can have the substrate 104 and can be contoured to have a first region 918, a second region 920, and a third region 922. A width $W_{B9-1}$ of the first region 918 and third region 920 can be measured along a transverse axis T at a proximal end 908 of the body 902 from an edge 914 to an edge 916 of the body 902 and at a distal end 912 of the body 902 from the edge 914 to the edge 916 of the body 902. A width $W_{B9-2}$ of the second region 920 can be measured along the transverse axis T at a point 905 between the proximal end 908 and the distal end 912 of the body 102 from the edge 114 to the edge 116 of the body 102. The point 905 can correspond to a midpoint between the proximal end 908 and the distal end 912 of the body (equal distance from the proximal end 908 and the distal end 912) or can be offset from the midpoint to be closer to the proximal end 908 or closer to the distal end 912. The width $W_{B9-2}$ is greater than the width $W_{B9-1}$ in the illustrated example embodiment.

The body 902 can be contoured along the body length $L_{B9}$ by the first region 918 which can have a first body length $L_{B9-1}$ extending along a longitudinal axis L from a terminal end 906 at the proximal end of the body 902 to a proximal end of the second region 920, which coincides with a distal end of the first region 918. The second region 920 can have a second body length $L_{B9-2}$ extending along the longitudinal axis L from the proximal end of the second region 920 to a distal end of the second region 920, which coincides with a beginning or proximal end of the third region 922 having a third body length $L_{B9-3}$ extending along the longitudinal axis L from the distal end of the second region 920 to a terminal end 910 at the distal end of the body 902. A width of the second region A sum of the first through third body lengths ($L_{B9-1}+L_{B9-2}+L_{B9-3}$) is equal to the length $L_{B9}$ of the body 902 ($L_{B9}=L_{B9-1}+L_{B9-2}+L_{B9-3}$).

The radiofrequency identification device (RFID) circuit 130 can be supported by the body 102 in the second region 920. The body 102 can also support the conductive elements 140 and/or 150 that are separate and distinct from the RFID circuit 130. The conductive element 140 can be positioned in the first region 918 of the body 102 and a portion of the conductive element 140 can be positioned in the second region 920. As an example, the conduct element 140 can extend between the terminal end 906 of the body 902 and the proximal end 131 of inductive loop 134. The conductive element 140 can be spaced away from the RFID circuit 130 by the gap 160, which may or may not include the dielectric material 162. The conductive element 150 can be positioned in the third region 922 of the body 902 and a portion of the conductive element 150 can be positioned in the second region 920. As an example, the conduct element 150 can extend between the terminal end 910 of the body 902 and the distal end 133 of the inductive loop 134. The conductive element 150 can be spaced away from the RFID circuit 130 by the gap 170, which may or may not include the dielectric material 162.

FIG. 10A-C illustrate an example embodiment of the wristband 100 in a closed state such that the wristband 100 has a loop configuration in accordance with embodiments of the present disclosure. As shown in FIGS. 10A-C, the wristband 100 is wrapped about itself in a (geometric) loop 1000 such that one of the terminal ends (e.g., terminal end 110) of the wristband 100 is wrapped about the other (e.g., terminal end 106) and affixed to the body 102 (e.g., to the surface 104a of the substrate 104) of the wristband 100. The loop 1000 can have a diameter D. The diameter D or the loop 1000 can vary based on a size of the wearer. As an example, the diameter D of the loop 1000 can be approximately one and a half (1.5) inches to approximately five (5) inches. In the loop configuration, the conductive elements 140 and/or 150 are contained within the loop 1000 and extend circumferentially about a wearer (e.g., a wrist 1010 of the wearer). As an example, the conductive elements 140 and/or 150 are contained within the loop 1000 and extend circumferentially about a wearer (e.g., a wrist 1010 of the wearer) such that the conductive material of the conductive element 140, the conductive element 150, and/or a combination of the conductive element 140 and the conductive element 150 extend circumferentially approximately 90 degrees to approximately 720 degrees or approximately 180 degrees to 720 degrees or approximately 135 degrees to 720 degrees or approximately 270 degrees to 720 degrees, for example, when the diameter D of the loop 1000 is approximately one and a half (1.5) inches to approximately five (5) inches. The RFID circuit 130 is also contained in the loop 1000 and extends circumferentially about the loop 1000 (e.g., as opposed to flag style wristband where the RFID circuit is not included in the loop). Because the RFID circuit 130 is included in the loop 1000, the RFID circuit 130 it is more likely that the RFID circuit 130 will be positioned in a manner that interferes with the operation of the RFID circuit 130. For example, when the loop 1000 is wrapped about the wrist 1010 of a wearer, the wrist 1010 can interfere with reception of radiofrequency waves from an RFID reader/interrogator (e.g., RFID reader 1310 shown in FIG. 13), particularly, for example, when the wrist 1010 or body of the wearer is positioned between the RFID circuit 130 and the RFID reader (e.g., RFID reader 1310 shown in FIG. 13), such that the RFID circuit 130, for example, does not generate enough power from the inductive coupling to respond to the RFID reader based on an electric current induced in the antenna and/or inductive loop of the RFID circuit 130. However, by including the conductive elements 140 and/or 150 in the loop and having the conductive elements extend circumferentially about the loop, an electric current can be induced in the conductive elements 140 and/or 150, which in turn, can induce an electric current in the antenna and/or inductive loop of the RFID circuit 130 or can increase an electric current induced (where at least some electric current may also be induced in the antenna and/or inductive loop by the radiofrequency waves. The positioning of the conductive elements 140 and/or 150 relative to the RFID circuit 130 (e.g., leaving the gaps 160 and/or 170 between the inductive loop 134 and the conductive elements 140 and/or 150 and/or including the dielectric material 162 in the gaps 160 and/or 170, respectively) advantageously allows the conductive elements 140 and/or 150 to improve a response of the RFID circuit 130 without generating electromagnetic interference that would otherwise negate the benefits of the conductive elements 140 and/or 150.

Figure 11A:
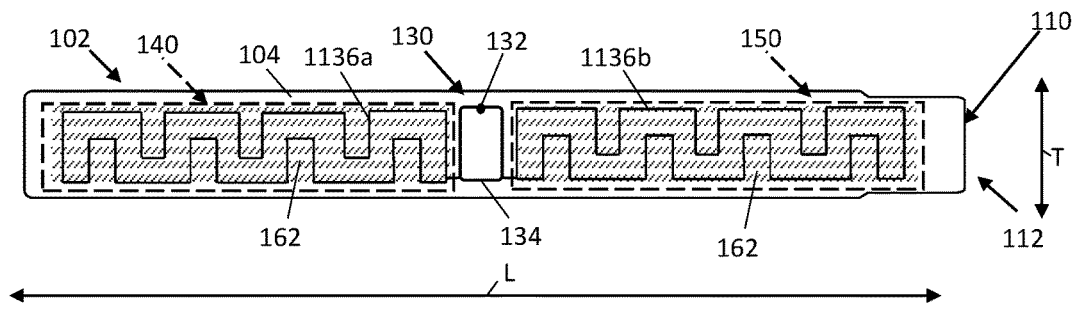
FIGS. 11A-C is a plan view of an example of wristbands in which the antennas of the RFID circuit extend between the proximal and distal ends of the body of the wristband in accordance with embodiments of the present disclosure.
Figure 11B:
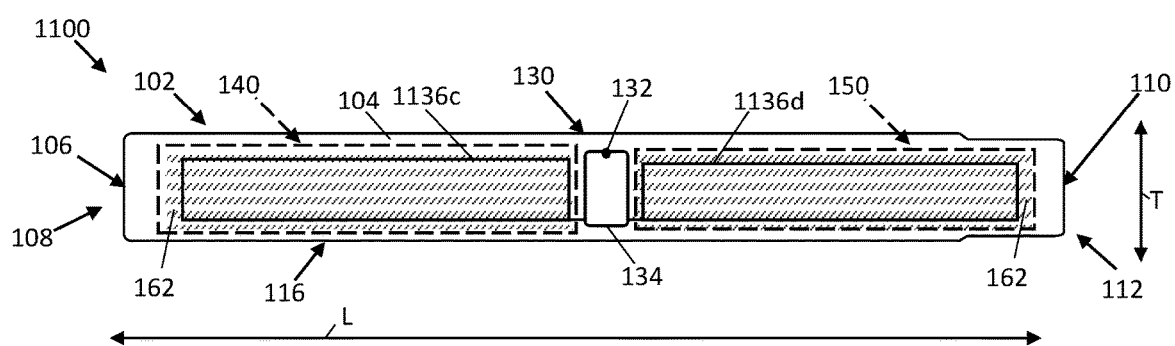
Figure 11C:
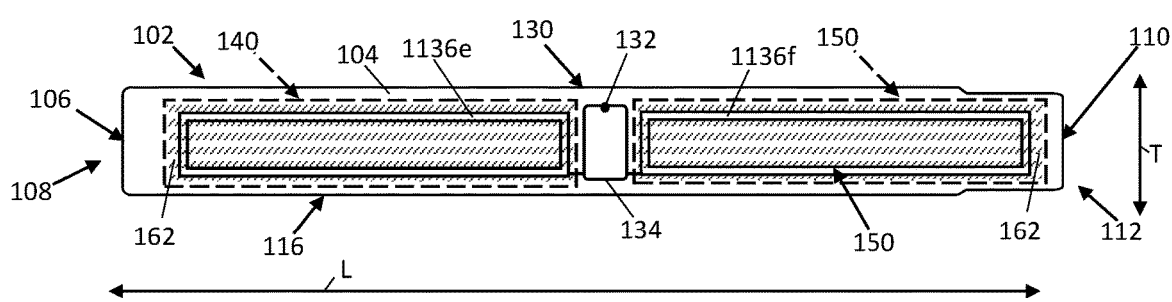

FIGS. 11A-C illustrate embodiments of wristband 1100A-C that include features of the wristband 100, including the conductive elements 140 and/or 150 as described herein, except that the antennas of the RFID circuit 130 are extended along the longitudinal axis L. As shown in FIG. 11A, the RFID circuit 130 includes antennas 1136a-b, which are dipole antennas having a serpentine pattern similar to the antennas 136a-b. The antennas 1136a-b can have the same length as the antennas 136a-b along the serpentine pattern (e.g., one quarter of the wavelength, one half of the wavelength, three quarters of the wavelength, the wavelength, etc.) except that the antennas 1136a-b can be configured and dimensioned to extend further along the longitudinal axis L than the antennas 136a-b (e.g., shown in FIG. 1A). The antenna 1136a can extend from the proximal end 131 of the inductive loop 134 to or near the proximal end 106 of the body 102 and the antenna 1136b can extend from the distal end 133 of the inductive loop 134 to or near the distal end 110 of the body 102. As shown in FIG. 11B, the RFID circuit 130 includes antennas 1136c-d, which are dipole antennas having a linear rectangular shape. The antennas 1136c-d can have the same length as the antennas 136a-b (e.g., one quarter of the wavelength, one half of the wavelength, three quarters of the wavelength, the wavelength, etc.) except that the antennas 1136a-b can be configured and dimensioned to extend along the longitudinal axis L a further distance than the antennas 136a-b. The antenna 1136c can extend from the proximal end 131 of the inductive loop 134 to or near the proximal end 106 of the body 102 and the antenna 1136d can extend from the distal end 133 of the inductive loop 134 to or near the distal end 110 of the body 102. As shown in FIG. 11C, the RFID circuit 130 includes antennas 1136e-f, which are loop antennas. The antennas 1136a-b can be configured and dimensioned to extend further along the longitudinal axis L than the antennas 136a-b. The antenna 1136e can extend from the proximal end 131 of the inductive loop 134 to or near the proximal end 106 of the body 102 and the antenna 1136f can extend from the distal end 133 of the inductive loop 134 to or near the distal end 110 of the body 102. When the wristbands 1100A-C are in a closed state such that the wristbands 1100A-C have a loop configuration, e.g., as in FIGS. 11A-C, the wristbands 1100A-C are wrapped about themselves in the loop 1000 (FIG. 10) such that one of the terminal ends (e.g., terminal end 110) of the wristbands 1100A-C is wrapped about the other (e.g., terminal end 106) and affixed to the body 102 (e.g., to the surface 104a of the substrate 104) of the wristband 1100A-C. As described herein, the diameter of the loop can vary based on a size of the wearer. As an example, the diameter of the loop formed by wristbands 1100A-C can be approximately one and a half (1.5) inches to approximately five (5) inches. In the loop configuration, the antennas 1136a-b, 1136c-d, and 1136e-f are contained within their respective loops and extend circumferentially about a wearer (e.g., the wrist 1010 shown in FIG. 10C). As an example, the antennas 1136a-b, 1136c-d, and 1136e-f are each contained within their respective loops and extend circumferentially about the wearer (e.g., the wrist 1010 of the wearer) such that the antennas 1136a-b, 1136c-d, and 1136e-f extend circumferentially approximately 90 degrees to approximately 720 degrees or approximately 180 degrees to 720 degrees or approximately 135 degrees to 720 degrees or approximately 270 degrees to 720 degrees, for example, when the diameter of their respective loops are approximately one and a half (1.5) inches to approximately five (5) inches.

Figure 12:
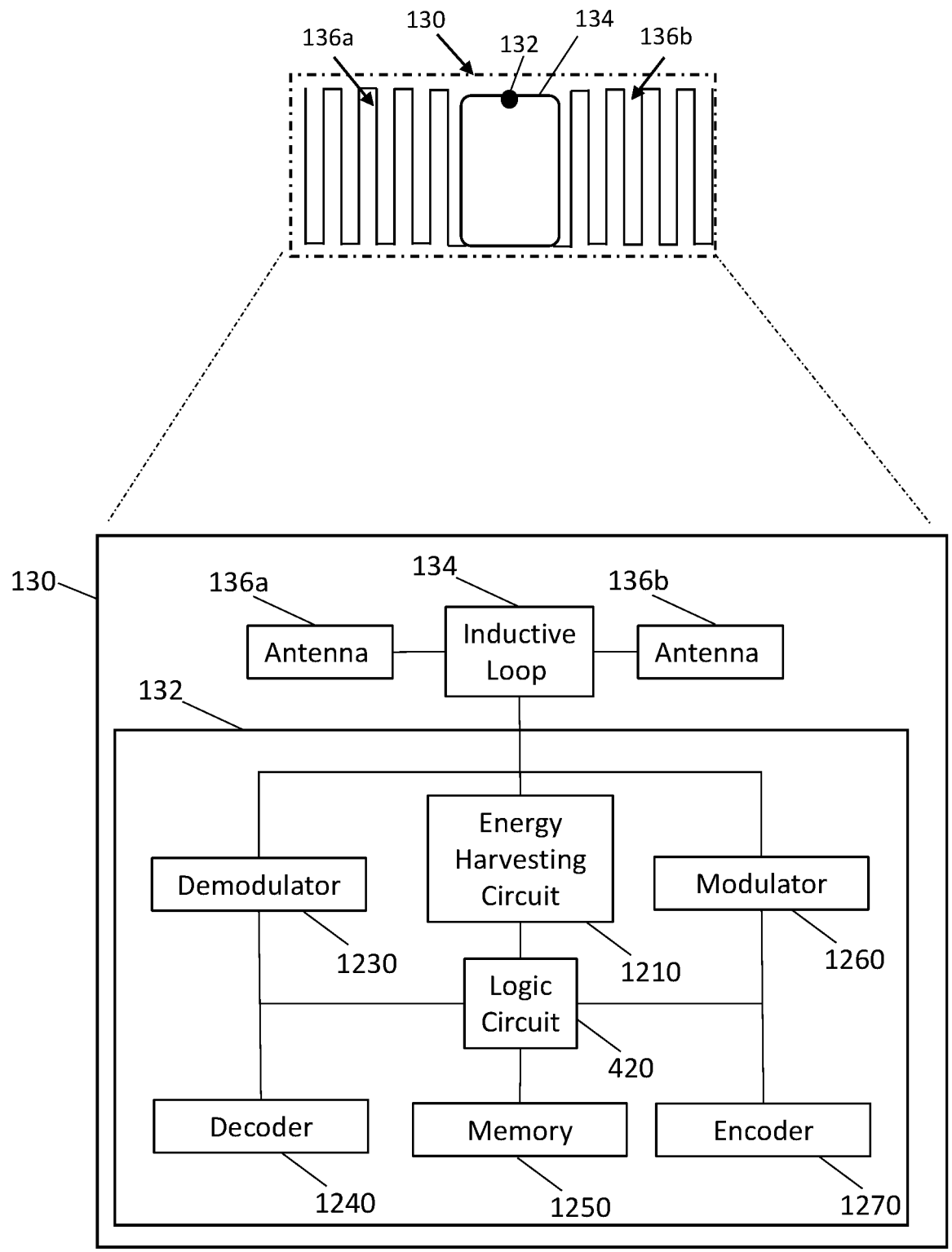
FIG. 12 is a block diagram of an example embodiment of the RFID circuit in accordance with embodiments of the present disclosure.

FIG. 12 is a block diagram of an example embodiment of the RFID circuit 130 in accordance with embodiments of the present disclosure. As shown in FIG. 12, the electronic circuit 132 of the RFID circuit 130 can include an energy harvesting circuit 1210, a logic circuit 1220, a demodulator 1230, a decoder 1240, memory 1250, a modulator 1260, and an encoder 1270. As a non-limiting example, the electronic circuit 132 can be implemented as one or more integrated and/or discrete circuits.

The memory 1250 is a non-transitory computer-readable medium that can include volatile (e.g., RAM) and/or non-volatile memory (e.g., EEPROM). The memory 1250 can store data, including an identifier, which can be used in a system to identify and distinguish the RFID circuit 130 from other RFID circuits in a system and can also be used to associate the RFID circuit 130 with an object in the system. In an example embodiment, the identifier can be a string of alphanumeric characters. The RFID circuit 130 can be associated with the wristband 100 and/or can be associated with a person, animal, or object about which the wristband 100 is wrapped. For example, when RFID circuit 130 of the wristband 100 is interrogated by an RFID reader, the RFID circuit 130 may respond with the stored identifier to identify itself and the RFID reader and/or other devices can use the association between the identifier, the wristband 100, and/or the wearer of the wristband 100 to determine and/or retrieve information about the wearer, and/or the RFID reader and/or other devices can perform one or more operations based on the receipt of the identifier and/or the information determined and/or retrieved about the wearer of the wristband 100 based on the identifier.

When the RFID circuit 130 is within a read range of the RFID reader/interrogator, radio waves of the far-field radiofrequency communication emitted by the RFID reader can generate a time varying electromagnetic field, which in turn can induce, via inductive coupling, an electrical signal (e.g., an electric current) in the antenna 136*a-b* (or antennas 1136*a-b*, 1136*c-d*, 1136*e-f*) and the inductive loop 134. As described herein, the conductive elements 140 and/or 150 can increase the read range of the RFID circuit 130, can increase a read angle of the RFID circuit 130, and/or can allow the RFID circuit 130 to be read by the RFID reader independent of the orientation of the RFID circuit in the wristband relative to a body part of the wearer and position of the RFID reader, e.g., by inducing more power in the RFID circuit 130, particularly when there is radiofrequency interference from a body part of the wearer. The electrical signal can be processed by the energy harvesting circuit 1210 to generate a power supply voltage to power the components of the electronic circuit 132. For example, the energy harvesting circuit 1210 receives the electrical signal from the inductive loop 134 and converts the electrical signal to a direct current voltage. The energy harvesting circuit 1210 can include, for example, a charge pump, voltage converter, voltage regulator, and/or other circuitry. The electrical signal can also include information that can be demodulated by the demodulator 1230 and decoded by the decoder 1240. The decoded electrical signal can be received as an input by the logic circuit 1220 from the decoder 1240.

In response to receipt of the decoded electrical signal and when sufficient power is generated from the induced electrical current, the logic circuit 1220 can retrieve data from the memory 1250 (e.g., the identifier) and output the data to the encoder 1270. The logic circuit 1220 can include software, firmware, and/or hardware, or any combination thereof to facilitate the operations performed by the logic circuit 1220. For example, the logic circuit 1220 can include digital circuitry, such as logic gates. The encoder 1270 can encode the data from the logic circuit 1220 and output the encoded data to the modulator 1260, which can modulate the encoded data and output the modulated data to the inductive loop 134, which can, in combination with the antennas 136*a-b* modulate the modulated signal onto the far-field radiofrequency communication received by the RFID circuit 130 from the RFID reader.

While an example embodiment of the RFID circuit 130 has been illustrated in FIG. 12, embodiments of the RFID circuit 130 can include more, fewer, and/or different components. As an example, the RFID circuit 130 can include any number of energy harvesting circuits, demodulators, decoders, logic circuits, encoders, and/or modulators.

Figure 13:
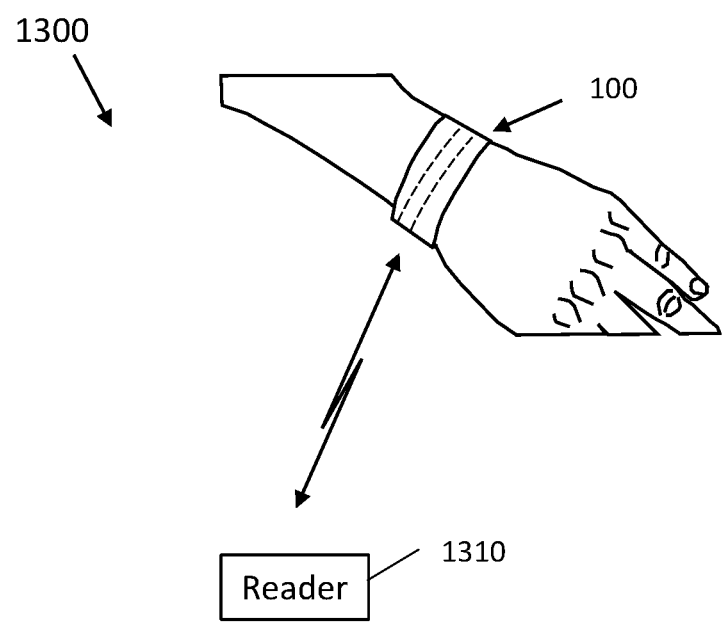
FIG. 13 illustrates an example of a system including an RFID reader and a wristband in accordance with embodiments of the present disclosure.

FIG. 13 is an example environment 1300 in accordance with embodiments of the present disclosure. The environment 1300 can include far-field RFID reader 1310 and an embodiment of the wristband 100 (or wristbands 900, 1100A-C) wrapped in a loop about a wrist of the wearer. The RFID reader 1310 can be disposed at a fixed or stationary location and/or can be moved to different locations. For example, the RFID reader 1310 can be spaced away from the RFID circuit 130 to facilitate far-field radiofrequency communication (e.g., RFID reader 1310 can be greater than twelve inches, two feet, three feet, four feet, five feet, six feet, seven feet, eight feet, or more from the RFID circuit 130). The RFID reader 1310 can attempt to interrogate the RFID circuit 130 by emitting a far-field radiofrequency communication. As described herein, when the wristband 100 is wrapped in a loop about the wrist of a wearer and the RFID circuit 130 is included in the loop, the wrist 1010 can cause radiofrequency interfere with reception of radiofrequency waves from an RFID reader/interrogator, particularly when the wrist 1010 is positioned between the RFID circuit 130 and the RFID reader 1310. The radiofrequency interference can reduce the read range of the RFID circuit 130 such that the RFID circuit 130 needs to be closer to the RFID reader 1310 than it normally would need to be without the radiofrequency interference, the power of the radiofrequency waves emitted by the RFID reader 1310 would need to be increase to compensate for the interference, or the orientation of the reader or the RFID circuit would need to be adjusted. However, by including the conductive elements 140 and/or 150 in the loop formed by the wristband and having the conductive elements extend circumferentially about the loop, an electric current can be induced in the conductive elements 140 and/or 150, which in turn, can induce an electric current in the antenna and/or inductive loop of the RFID circuit 130 or can increase an electric current induced (where at least some electric current may also be induced in the antenna and/or inductive loop by the radiofrequency waves).

Figure 16:
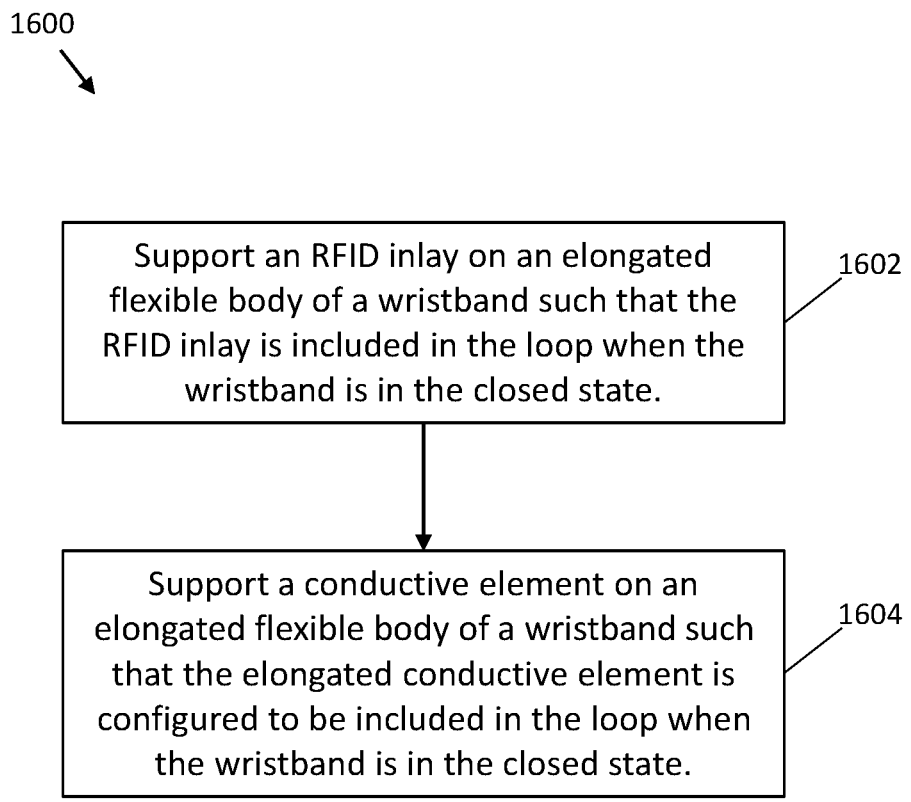
FIG. 16 is a flowchart illustrating an example process in accordance with embodiments of the present disclosure.

FIG. 16 is a flowchart illustrating an example process 1600 of forming an example wristband (e.g., wristband 100) in accordance with embodiments of the present disclosure. At operation 1602, an RFID circuit (e.g., RFID circuit 130) is supported on an elongated flexible body (e.g., body 102) of the wristband. The wristband has an open state in which the wristband is capable of being positioned in a planar configuration and has a closed state in which the wristband is wrapped in a loop (e.g., loop 1000) such that a first end (e.g., terminal end 110) of the wristband overlaps a second end (e.g., terminal end 106) of the wristband and is fixed to the body. The RFID circuit is supported by the body by positioning the RFID circuit on the body such that the RFID circuit is configured to be included in the loop 1000 when the wristband is in the closed state. At operation 1604, an elongated conductive element (e.g., conductive elements 140 and/or 150) is supported on the elongated body of the wristband. The elongated conductive element is supported on the body by positioning the conductive element on the body such that the elongated conductive element is configured to be included in the loop when the wristband is in the closed state. The conductive element can be added, for example, by thermal transfer printing with metallic ribbon, foil stamping, and/or laminating metalized polyester labels. The elongated conductive element is spaced away from the RFID circuit and extends circumferentially about the loop in the closed state. The body can be formed by a substrate having a first surface and a second surface opposite the first surface, a thickness of the substrate being measured between the first and second surfaces, and the RFID circuit can be disposed on the first surface and the conductive element can be disposed on the first or second surface. The RFID circuit and the conductive element can be spaced away from each other by a gap, which can include a dielectric material. At operating 1606, a further conductive element can be supported on the body. The further conductive element can be supported on the body by positioning the further conductive element on the body such that the further conductive element is included in the loop when the wristband is in the closed state. The further conductive element is spaced away from the RFID circuit and extends circumferentially about the loop in the closed state. The conductive element extends between a proximal end of the body and a proximal end of the RFID circuit and the further conductive element extends between a distal end of the body and a distal end of the RFID circuit.

Figure 17:
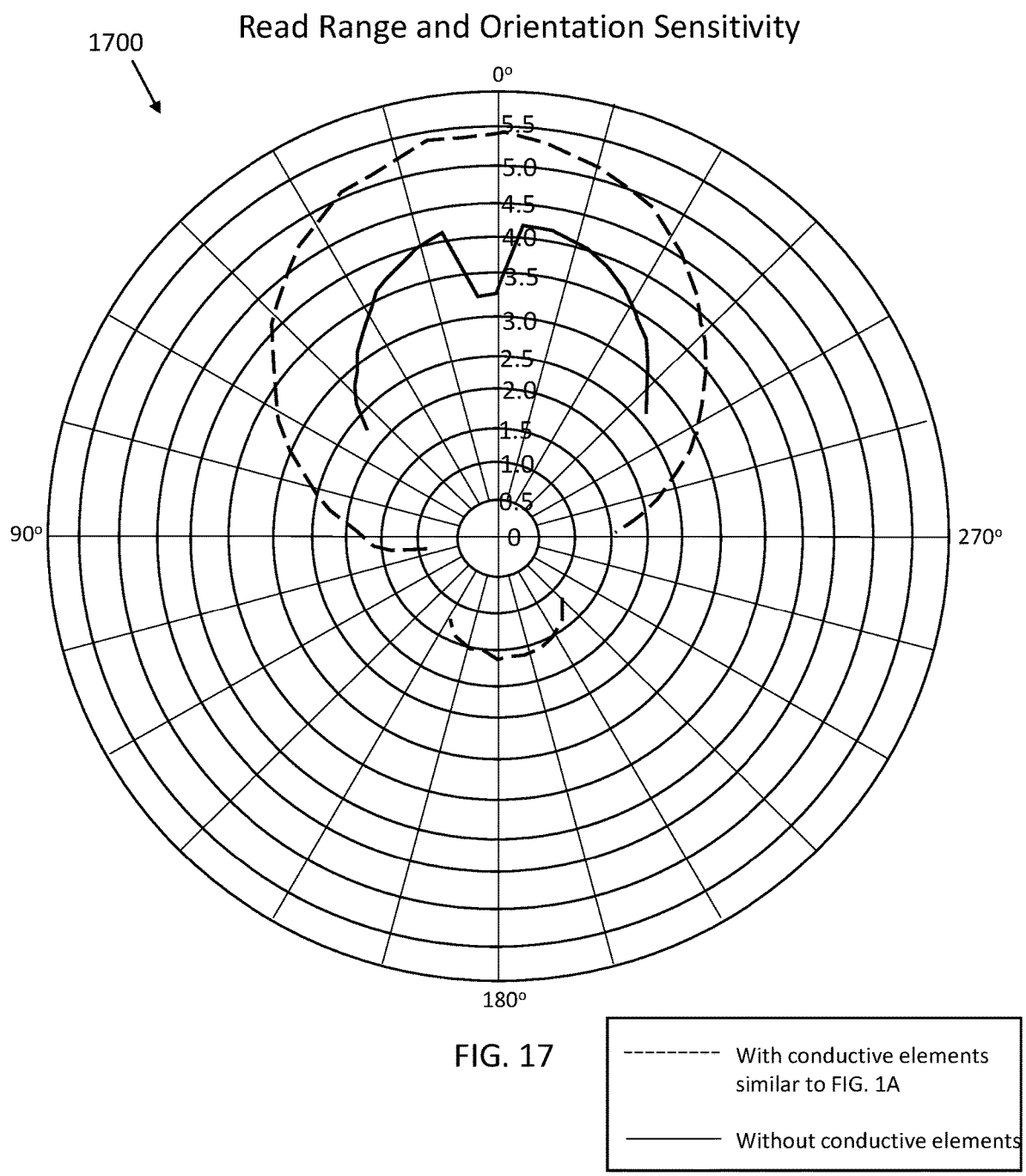
FIG. 17 is a graph illustrating a read response of an RFID circuit in an example wristband having conductive elements similar to those shown in FIG. 1A.
Figure 18:
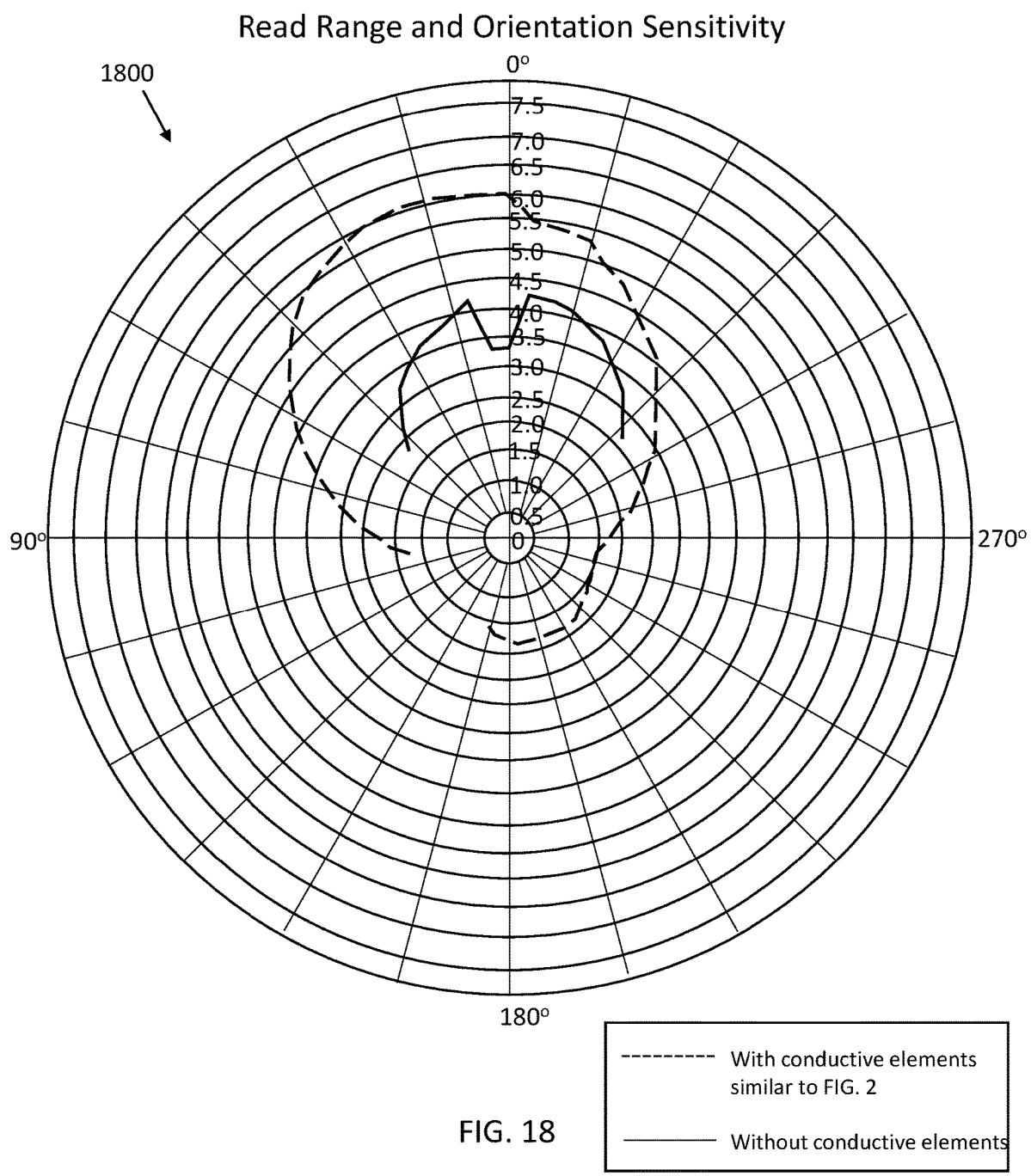
FIG. 18 is a graph illustrating a read response of an RFID circuit in an example wristband having conductive elements similar to those shown in FIG. 2.
Figure 19:
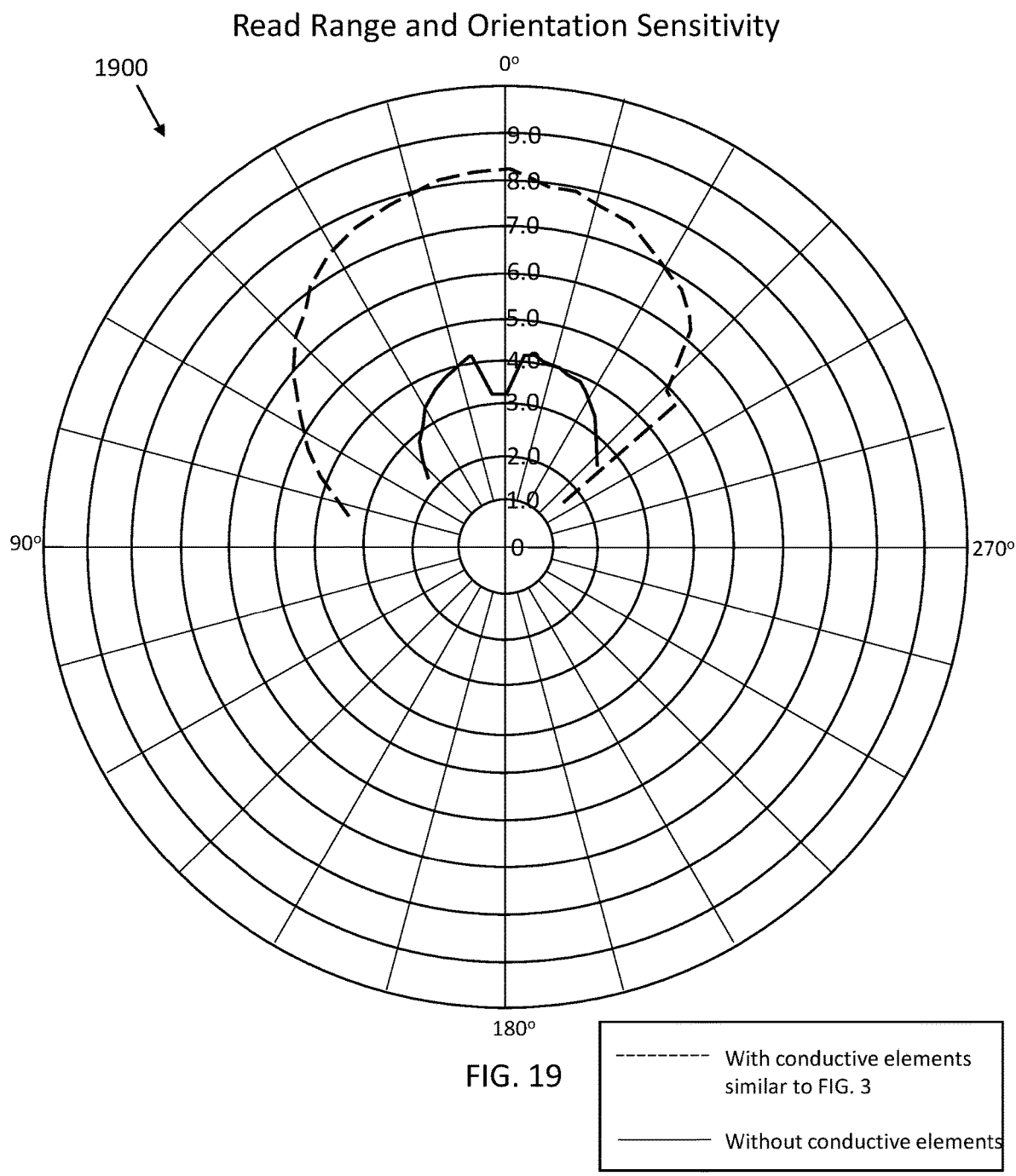
FIG. 19 is a graph illustrating a read response of an RFID circuit in an example wristband having conductive elements similar to those shown in FIG. 3.

FIGS. 17-19 illustrate experimental results of a read response and orientation sensitivity of RFID circuits in example embodiments of wristbands described herein. The experimental setup is shown in FIG. 13, where the reader 1310 is rotated circumferentially about the wristband or by rotating the wristband about circumferentially about the reader 1310 by three hundred sixty 360 degrees. The experimental setup included the wristband being wrapped in a loop about a phantom arm that imitates an arm of a human for radiofrequency experiments. The phantom arm utilized for the experiments was the SHO Generic Forearm Phantom CTIA Version 1 from Speag and a response of the RFID circuit in the wristbands were measured by the Tagformance Pro system from Voyantic.

FIG. 17 is a graph 1700 illustrating an experimental read response and orientation sensitivity of an RFID circuit in an example wristband having a configuration illustrated in FIG. 10C with conductive elements similar to conductive elements 140 and/or 150 illustrated in FIG. 1A (e.g., single strips of conductive material having a width) as well as in a wristband without any conductive elements. The graph 1700 measures a read range radially from a center axis (which corresponds to a range of 0 meters) by the concentric circles and measures a read angle from zero (0) degrees to three hundred sixty degrees (360) degrees circumferentially in a counterclockwise direction. As shown in FIG. 17, the read range of the wristband with the conductive elements similar to the conductive elements illustrated in FIG. 1A produced a greater read range than the wristband that is devoid of the conductive elements. The wristband with the conductive elements similar to the conductive elements illustrated in FIG. 1A produced a greater read angle than the wristband that is devoid of the conductive elements.

FIG. 18 is a graph 1800 illustrating an experimental read response and orientation sensitivity of an RFID circuit in an example wristband having a configuration illustrated in FIG. 10C with conductive elements similar to conductive elements 140 and/or 150 illustrated in FIG. 2 (e.g., two parallel strips of conductive material having a width) as well as in a wristband without any conductive elements. The graph 1800 measures a read range radially from a center axis (which corresponds to a range of 0 meters) by the concentric circles and measures a read angle from zero (0) degrees to three hundred sixty degrees (360) degrees circumferentially in a counterclockwise direction. As shown in FIG. 18, the read range of the wristband with the conductive elements similar to the conductive elements illustrated in FIG. 2 produced a greater read range than the wristband that is devoid of the conductive elements. The wristband with the conductive elements similar to the conductive elements illustrated in FIG. 2 produced a greater read angle than the wristband that is devoid of the conductive elements.

FIG. 19 is a graph 1900 illustrating an experimental read response and orientation sensitivity of an RFID circuit in an example wristband having a configuration illustrated in FIG. 10C with conductive elements similar to conductive elements 140 and/or 150 illustrated in FIG. 3 (e.g., three parallel strips of conductive material having a width) as well as in a wristband without any conductive elements. The graph 1900 measures a read range radially from a center axis (which corresponds to a range of 0 meters) by the concentric circles and measures a read angle from zero (0) degrees to three hundred sixty degrees (360) degrees circumferentially in a counterclockwise direction. As shown in FIG. 19, the read range of the wristband with the conductive elements similar to the conductive elements illustrated in FIG. 3 produced a greater read range than the wristband that is devoid of the conductive elements. The wristband with the conductive elements similar to the conductive elements illustrated in FIG. 3 produced a greater read angle than the wristband that is devoid of the conductive elements.

The above description refers to a block diagram of the accompanying drawings. Alternative implementations of the example represented by the block diagram includes one or more additional or alternative elements, processes and/or devices. Additionally, or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A device, comprising:
    a wristband having a flexible elongated body, the wristband having an open state in which the wristband is capable of being positioned in a planar configuration and having a closed state in which the wristband is wrapped in a loop such that a first end of the wristband overlaps a second end of the wristband and is fixed to the body;
    an RFID circuit supported by the elongated body of the wristband, the RFID circuit being positioned on the body such that the RFID circuit is configured to be included in the loop when the wristband is in the closed state; and
    an elongated conductive element supported by the elongated body of the wristband, the elongated conductive element being positioned on the body such that the elongated conductive element is configured to be included in the loop when the wristband is in the closed state, the elongated conductive element is spaced away from the RFID circuit and extends circumferentially about the loop in the closed state, wherein the body is formed by a substrate having a first surface and a second surface opposite the first surface, a thickness of the substrate being measured between the first and second surfaces, wherein the RFID circuit and the conductive element are disposed on the first surface, and wherein the RFID circuit includes an electronic circuit, an inductive loop operatively coupled to the electronic circuit, and an antenna operatively coupled to the inductive loop, the conductive element overlaps at least a portion of the antenna and is spaced away from the inductive loop by a gap.

2. The device of claim 1, further comprising a dielectric material disposed between the conductive element and the antenna.

3. The device of claim 1, wherein the conductive element is at least one strip of conductive material.

4. The device of claim 3, wherein the conductive material is at least one of metal, conductive ink, conductive threads, conductive adhesive, graphene, or graphite.

5. The device of claim 1, comprising:
a further substrate,
wherein the RFID circuit and the conductive element are disposed between the substrate and the further substrate.

6. The device of claim 1, wherein, in response to exposure of the wristband to radiofrequency waves within a specified frequency range, the conductive element increases a power induced in the RFID circuit, and
wherein the a read range of the RFID circuit is increased by the conductive element.

7. A device, comprising:
a wristband having a flexible elongated body, the wristband having an open state in which the wristband is capable of being positioned in a planar configuration and having a closed state in which the wristband is wrapped in a loop such that a first end of the wristband overlaps a second end of the wristband and is fixed to the body;
an RFID circuit supported by the elongated body of the wristband, the RFID circuit being positioned on the body such that the RFID circuit is configured to be included in the loop when the wristband is in the closed state; and
an elongated conductive element supported by the elongated body of the wristband, the elongated conductive element being positioned on the body such that the elongated conductive element is configured to be included in the loop when the wristband is in the closed state, the elongated conductive element is spaced away from the RFID circuit and extends circumferentially about the loop in the closed state,
wherein the RFID circuit includes an electronic circuit, an inductive loop operatively coupled to the electronic circuit, and an antenna operatively coupled to the inductive loop, and the conductive element extends between a proximal end of the body and a proximal end of the inductive loop.

8. The device of claim 7, further comprising:
a further conductive element, the further conductive element is positioned on the body such that the further conductive element is configured to be included in the loop when the wristband is in the closed state, the further conductive element is spaced away from the RFID circuit and extends circumferentially about the loop in the closed state.

9. The device of claim 8, wherein the further conductive element extends between a distal end of the body and a distal end of the inductive loop.

10. The device of claim 8, wherein the RFID circuit includes a further antenna and the further conductive element overlaps at least a portion of the further antenna and is spaced away from the inductive loop by a further gap.

11. The device of claim 7, wherein the conductive element extends circumferentially about the loop by approximately ninety (90) degrees to approximately seven hundred twenty (720) degrees.

12. The device of claim 7, wherein the body is formed by a substrate having a first surface and a second surface opposite the first surface, a thickness of the substrate being measured between the first and second surfaces,
wherein the RFID circuit and the conductive element are disposed on the first surface, and
wherein the RFID circuit includes an electronic circuit, an inductive loop operatively coupled to the electronic circuit, and an antenna operatively coupled to the inductive loop, the conductive element overlaps at least a portion of the antenna and is spaced away from the inductive loop by a gap.

13. A device, comprising:
a wristband having a flexible elongated body, the wristband having an open state in which the wristband is capable of being positioned in a planar configuration and having a closed state in which the wristband is wrapped in a loop such that a first end of the wristband overlaps a second end of the wristband and is fixed to the body;
an RFID circuit supported by the elongated body of the wristband, the RFID circuit being positioned on the body such that the RFID circuit is configured to be included in the loop when the wristband is in the closed state; and
an elongated conductive element supported by the elongated body of the wristband, the elongated conductive element being positioned on the body such that the elongated conductive element is configured to be included in the loop when the wristband is in the closed state, the elongated conductive element is spaced away from the RFID circuit and extends circumferentially about the loop in the closed state,
wherein the body is formed by a substrate having a first surface and a second surface opposite the first surface, a thickness of the substrate being measured between the first and second surfaces, and
wherein the RFID circuit is disposed on the first surface and the conductive element is disposed on the second surface.

14. The device of claim 13, wherein the RFID circuit and the conductive element are spaced away from each other by at least the thickness of substrate.

15. The device of claim 14, further comprising:
a dielectric material is disposed between the RFID circuit and the conductive element.

16. The device of claim 15, wherein the dielectric material is part of the substrate.

17. The device of claim 13, wherein the conductive element extends circumferentially about the loop by approximately ninety (90) degrees to approximately seven hundred twenty (720) degrees.

18. A device, comprising:
- a wristband having a flexible elongated body, the wristband having an open state in which the wristband is capable of being positioned in a planar configuration and having a closed state in which the wristband is wrapped in a loop such that a first end of the wristband overlaps a second end of the wristband and is fixed to the body;
- an RFID circuit supported by the elongated body of the wristband, the RFID circuit being positioned on the body such that the RFID circuit is configured to be included in the loop when the wristband is in the closed state; and
- an elongated conductive element supported by the elongated body of the wristband, the elongated conductive element being positioned on the body such that the elongated conductive element is configured to be included in the loop when the wristband is in the closed state, the elongated conductive element is spaced away from the RFID circuit and extends circumferentially about the loop in the closed state,
- wherein the conductive element extends circumferentially about the loop by approximately ninety (90) degrees to approximately seven hundred twenty (720) degrees.

19. The device of claim 18, wherein the body is formed by a substrate having a first surface and a second surface opposite the first surface, a thickness of the substrate being measured between the first and second surfaces,
- wherein the RFID circuit and the conductive element are disposed on the first surface, and
- wherein the RFID circuit includes an electronic circuit, an inductive loop operatively coupled to the electronic circuit, and an antenna operatively coupled to the inductive loop, the conductive element overlaps at least a portion of the antenna and is spaced away from the inductive loop by a gap.

20. A method, comprising:
- supporting an RFID circuit on an elongated flexible body of a wristband, the wristband having an open state in which the wristband is capable of being positioned in a planar configuration and having a closed state in which the wristband is wrapped in a loop such that a first end of the wristband overlaps a second end of the wristband and is fixed to the body, the RFID circuit being positioned on the body such that the RFID circuit is configured to be included in the loop when the wristband is in the closed state; and
- supporting an elongated conductive element on the elongated body of the wristband, the elongated conductive element being positioned on the body such that the elongated conductive element is configured to be included in the loop when the wristband is in the closed state, the elongated conductive element is spaced away from the RFID circuit and extends circumferentially about the loop in the closed state, the elongated conductive element configured to extend circumferentially about the loop by approximately ninety (90) degrees to approximately seven hundred twenty (720) degrees.

* * * * *